United States Patent
Sunada et al.

(10) Patent No.: US 8,501,661 B2
(45) Date of Patent: Aug. 6, 2013

(54) CATALYST FOR CONVERTING EXHAUST GASES

(75) Inventors: Tomoaki Sunada, Toyota (JP); Hideaki Ueno, Okazaki (JP); Yuki Aoki, Nissin (JP); Takeru Yoshida, Miyoshi (JP); Masahiro Nakahara, Nissin (JP); Masaaki Kawai, Kakegawa (JP); Singo Sakagami, Kakegawa (JP)

(73) Assignees: Toyota Jidosha Kabushiki Kaisha, Toyota-shi, Aichi-ken (JP); Cataler Corporation, Shizuoka (JP)

( * ) Notice: Subject to any disclaimer, the term of this patent is extended or adjusted under 35 U.S.C. 154(b) by 0 days.

(21) Appl. No.: 13/519,906

(22) PCT Filed: Dec. 27, 2010

(86) PCT No.: PCT/JP2010/073895
§ 371 (c)(1),
(2), (4) Date: Jun. 29, 2012

(87) PCT Pub. No.: WO2011/081219
PCT Pub. Date: Jul. 7, 2011

(65) Prior Publication Data
US 2012/0283091 A1 Nov. 8, 2012

(30) Foreign Application Priority Data

Jan. 4, 2010 (JP) .................... 2010-000163
Jun. 18, 2010 (JP) .................... 2010-138915

(51) Int. Cl.
*B01J 23/00* (2006.01)

(52) U.S. Cl.
USPC ............ 502/325; 502/304; 502/333; 502/339

(58) Field of Classification Search
USPC ................... 502/325, 333, 339, 304
See application file for complete search history.

(56) References Cited

U.S. PATENT DOCUMENTS

| 6,087,298 A | 7/2000 | Sung et al. |
| 6,887,444 B1 | 5/2005 | Yamamoto |

(Continued)

FOREIGN PATENT DOCUMENTS

| JP | 6-63403 | 3/1994 |
| JP | 9-500570 | 1/1997 |

(Continued)

OTHER PUBLICATIONS

International Search Report in International Application No. PCT/JP2010/073895; Mailing Date: Feb. 15, 2012.

(Continued)

*Primary Examiner* — Colleen Dunn
*Assistant Examiner* — Haytham Soliman
(74) *Attorney, Agent, or Firm* — Finnegan, Henderson, Farabow, Garrett & Dunner, LLP

(57) ABSTRACT

A catalyst for purifying exhaust gases includes a substrate, and a catalytic layer. The catalytic layer includes a lower catalytic layer, a first upper catalytic layer, and a second upper catalytic layer. The lower catalytic layer being loaded with Pd and/or Pt is formed on the substrate. The first upper catalytic layer being loaded with Pd covers an upstream side of the lower catalytic layer, and exhibits a concentration of loaded Pd that falls in a range of from 4.5 to 12% by mass when the entirety of the first upper catalytic layer is taken as 100% by mass. The second upper catalytic layer being loaded with Rh covers a downstream side of the lower catalytic layer.

8 Claims, 11 Drawing Sheets

U.S. PATENT DOCUMENTS

| | | |
|---|---|---|
| 2004/0001781 A1 | 1/2004 | Kumar et al. |
| 2006/0270550 A1 | 11/2006 | Shimizu et al. |
| 2010/0150792 A1 | 6/2010 | Kitamura et al. |

FOREIGN PATENT DOCUMENTS

| | | |
|---|---|---|
| JP | 2000-510761 | 8/2000 |
| JP | 2003-170047 | 6/2003 |
| JP | 2006-326428 | 12/2006 |
| JP | 2007-38072 | 2/2007 |
| WO | WO 95/00235 | 1/1995 |

OTHER PUBLICATIONS

Written Opinion of the International Searching Authority in International Application No. PCT/JP2010/073895; Mailing Date: Feb. 15, 2012.

CATALYST FOR CONVERTING EXHAUST GASES

DESCRIPTION

1. Technical Field

The present invention relates to a catalyst for purifying exhaust gases. In particular, it relates to a catalyst for purifying exhaust gases that comprises an upstream side and a downstream side, on which different species of catalytic ingredients are loaded respectively, in the flow passage of exhaust gases.

2. Background Art

A catalyst for converting exhaust gases, which converts exhaust gases that are emitted from an automotive engine, is provided with a catalytic layer on the surface of a substrate. The catalytic layer comprises a catalytic ingredient, such as Pt, Pd and Rh, and a support for loading the catalytic ingredient thereon. The catalytic ingredient and support exhibit different functions depending on the respective components. Accordingly, while taking the facts that the temperature and exhaust-gas components show gradients between the respective parts or regions in catalyst into consideration, the following catalysts have been developed in order that the respective components can exhibit their properties effectively: zone-coated catalysts in which distinct components are disposed in the upstream side and downstream side of a substrate, respectively; and catalysts comprising components that are disposed distinctly between the inner layer and outer layer of a substrate, respectively.

For example, Japanese Unexamined Patent Publication (KOKAI) Gazette No. 2007-38,072 discloses to make a support of a ceria-rich ceria-zironia composite oxide in the upstream-section inner layer, to make another support of a zirconia-rich zirconia-ceria composite oxide in the upstream-section outer layer, and to make still another support of a zirconia-rich zirconia-ceria composite oxide in the downstream section. The ceria-rich composite oxide in the upstream-section inner layer adsorbs the components of exhaust gases, and then a noble metal, which is included in the catalytic layer, decomposes the adsorbed components of exhaust gases. The setting enhances the performance for converting exhaust gases, and augments the ignitability of exhaust gases especially.

Moreover, Published Japanese Translation of PCT Application Gazette No. 9-500,570 discloses a catalyst whose inner layer includes ceria and a first palladium catalytic ingredient and whose outer layer includes alumina and a second palladium catalytic ingredient. Since ceria is in contact with the first palladium catalytic ingredient closely in the inner layer, the inner layer promotes the oxidizing/reducing characteristic that the ceria shows at high temperatures (500° C. or more, for instance). The second palladium catalytic ingredient in the outer layer shows catalytic activities sufficiently during the initial heating and even at the operating temperatures of 500° C. or less. Thus, changing the types of supports between the inner layer and the outer layer improves the functions of palladium, thereby widening the operable-temperature window of catalyst.

In addition, Japanese Unexamined Patent Publication (KOKAI) Gazette No. 2006-326,428 discloses a catalyst that is set up as follows: Rh is included in the upstream side; Rh, and a catalytic noble metal other than Rh are included in the downstream side and the catalytic noble metal other than Rh is loaded more than Rh is loaded on the downstream side. The setting makes it possible to inhibit Rh from alloying with the other noble metals on the upstream side that is likely to become high temperatures. Moreover, the setting makes the downstream side exhibit conversion actions that result from the catalytic noble metal other than Rh.

However, in all of the catalysts for converting exhaust gases that are disclosed in the aforementioned three patent publication gazettes, the catalytic layers are not at all disposed at proper parts or regions in the substrate after fully considering the respective conversion characteristics of the catalytic noble metals. Rh, Pt and Pd are available as for the catalytic noble metals. Pt and Pd mainly contribute to converting CO and HC by means of oxidation. Rh mainly contributes to converting $NO_x$ by means of reduction. Thus, it has been desired to devise certain setups that enable the catalytic noble metals to show the conversion characteristics fully.

Moreover, the number of vehicles has come to increase recently, vehicles whose engine is operated to frequently run and then stop, or vice versa, repeatedly. Accordingly, it has been desired to upgrade the conversion performance of catalyst at low temperatures. In order to achieve the objective, it is possible to think of increasing a loading amount of catalytic noble metal. However, augmenting the loading amount has resulted in raising the material cost of catalyst.

In addition, the warm-up performance of catalyst is affected by the activity of catalytic noble metal being loaded on the upstream section and how likely it is that the catalyst is warmed up, namely, the catalyst's heat capacity. In zone-coated catalysts whose upstream side and downstream side are provided with catalytic layers having different compositions respectively, it is believed that the activity of catalytic noble metal on the upstream side depends greatly on the length and coating amount of an upstream-side catalytic layer on the upstream side. Moreover, it is believed that how likely the catalyst is warmed up likewise depends greatly on the coating amount and components of the upstream-side catalytic layer. Therefore, it is believed that there can be an optimum length and coating amount for the upstream-side catalytic layer in order to enhance the warming-up capability of the catalyst as a whole.

Moreover, in the zone coated catalysts, the more downstream side the downstream-side catalytic layer is disposed the more susceptible it is to the poisoning by sulfur, and degraded atmospheres. On the other hand, the more upstream side the downstream-side catalytic layer is disposed the more the utilization efficiency of the downstream-side catalytic layer's catalytic noble metal is upgraded. Accordingly, it is believed that there can be a length, which is balanced optimally for the downstream-side catalytic layer. Consequently, in order to make a zone-coated catalyst yield the performance maximally, it is important to set up an optimum length and coating amount for the upstream-side catalytic layer and those for the downstream-side catalytic layer, respectively.

DISCLOSURE OF THE INVENTION

The present invention has been developed in view of such circumstances. It is therefore an object of the-present invention to provide a catalyst for converting exhaust gases, catalyst which can demonstrate the conversion characteristics of catalytic ingredients fully, and which exhibits higher conversion performance at low temperatures.

A catalyst for converting exhaust gases according to the present invention comprises:

a substrate for forming a gas flow passage in which exhaust gases flow; and a catalytic layer being formed on the substrate;

the catalytic layer comprising:

a lower catalytic layer being formed on the substrate, and having a surface that does not come into contact with the substrate, the surface being made of an upstream side that is disposed on an upstream side of the catalytic layer with respect to a flowing direction of the exhaust gases and a downstream side that is disposed on a more downstream side than the upstream side is disposed in the flowing direction of the exhaust gases;

a first upper catalytic layer covering the upstream side of the lower catalytic layer;

a second upper catalytic layer covering the downstream side of the lower catalytic layer;

at least one member being selected from the group consisting of palladium (Pd) and platinum (Pt), and being loaded in the lower catalytic layer;

Pd being loaded in the first upper catalytic layer;

the first upper catalytic layer exhibiting a concentration of loaded Pd that falls in a range of from 4.5 to 12% by mass when the entirety of the first upper catalytic layer is taken as 100% by mass; and rhodium (Rh) being loaded in the second upper catalytic layer.

The catalyst for converting exhaust gases according to the present invention comprises the lower catalytic layer, the first upper catalytic layer, and the second upper catalytic layer. The lower catalytic layer includes at least one member that is selected from the group consisting of Pd and Pt. The first upper catalytic layer includes Pd. The second upper catalytic layer includes Rh. In the first upper catalytic layer, Pd mainly carries out the conversion of HC (or hydrocarbons) in exhaust gases by means of oxidation. HC are less likely to diffuse into the inside of upstream-side catalytic layers, because they have molecular structures that are large comparatively.

Moreover, HC are less likely to be decomposed than CO and $NO_x$ are, because HC have greater molecular weights than CO and $NO_x$ have. Accordingly, a high activation energy is required for the conversion reactions of HC, compared with those required for the conversion reactions of CO and $NO_x$. Consequently, it is preferable for an environment for reacting HC to exhibit a higher temperature. Hence, in the catalyst for converting exhaust gases according to the present invention, Pd, which is capable of converting HC, is loaded on the upstream-side first or preceding upper catalytic layer that is disposed on the upper side (or superficial side) into which HC are likely to diffuse, and additionally which are likely to be high temperatures. Therefore, Pd has many chances of coming into contact with HC. Besides, it is possible for Pd to convert HC highly efficiently under high-temperature conditions.

In addition, in the catalyst for converting exhaust gases according to the present invention, a concentration of Pd being loaded in the first upper catalytic layer is set to fall in a range of from 4.5 to 12% by mass when the entirety of the first upper catalytic layer is taken as 100% by mass. When the loaded concentration of Pd is less than 4.5% by mass with respect to the entire first upper catalytic layer being taken as 100% by mass, the amount of HC to be converted by Pd might lower because the absolute amount of the catalytic ingredient is too small. Even when the loaded concentration of Pd is more than 12% by mass with respect to the entire first upper catalytic layer being taken as 100% by mass, Pd might possibly convert HC in a lower conversion amount, too. Moreover, Pd has come to decline in the capability of converting HC when Pd is loaded in a concentration that is more than 12% by mass in the first upper catalytic layer.

Thus, loading Pd in the first upper catalytic layer in a higher concentration than those having been done heretofore, that is, loading Pd in the first upper catalytic layer in an amount of from 4.5 to 12% by mass when the entirety of the first upper catalytic layer is taken as 100% mass, enables the catalyst for converting exhaust gases according to the present invention to exhibit higher low-temperature activities than the conventional catalysts do. Moreover, loading Pd in the first upper catalytic layer as described above can inhibit the cost of the present catalyst from going up as a whole.

Meanwhile, Rh mainly carries out the conversion of $NO_x$ in exhaust gases by means of reduction at the downstream-side second upper catalytic layer. Rh has remaining HC in exhaust gases, which have not been converted by oxidation at the first upper catalytic layer, generate hydrogen by means of hydrogen reforming reaction. The resulting hydrogen converts $NO_x$ in exhaust gases by means of reduction, because it exhibits reducing power.

CO, one of the components in exhaust gases, has a smaller molecular structure relatively, and exhibits a faster diffusion velocity comparatively. Accordingly, CO can diffuse quickly into the lower catalytic layer that is disposed more inside than the first upper catalytic layer and second upper catalytic layer are disposed. Consequently, Pd and/or Pt being loaded in the lower catalytic layer can principally convert CO and remaining HC by means of oxidation.

As described above, the catalyst for converting exhaust gases according to the present invention comprises catalytic ingredients or catalytic noble metals that are disposed at optimum parts or regions in the catalyst, in view of the catalytic ingredients' characteristics. Accordingly, the catalytic ingredients can exhibit the conversion characteristics highly efficiently, respectively. Besides, the present catalyst demonstrates enhanced catalytic activities at low temperatures, because Pd, one of the catalytic ingredients, is loaded in a higher concentration than it has been loaded heretofore. Therefore, the present catalyst can show higher performance in the conversion of exhaust gases even during the times of being cold, such as immediately after starting engines and after stopping engines intermittently for hybrid vehicle.

In the catalyst for converting exhaust gases according to the present invention, it is preferable that the first upper catalytic layer can have a length that exhibits a proportion of from 20 to 40% when the entire length of the lower catalytic layer is taken as 100%. In this instance, it is possible for the first upper catalyst layer to exhibit the catalytic activities fully. Moreover, it is possible to securely provide a space for arranging the second upper catalytic layer on the downstream side of the present catalyst. Hence, while allowing Rh being loaded in the second upper catalytic layer to fully show the $NO_x$ conversion capability, it is possible to make the first upper catalytic layer show augmented HC conversion performance. Note that it is more preferable that the first upper catalytic layer's longitudinal proportion can fall in a range of from 25 to 35%, much more preferably from 30 to 35%, with respect to the lower catalytic layer's overall length being taken as 100%.

Moreover, it is preferable that the second upper catalytic layer can have a length that exhibits a proportion of from 70 to 85% when the entire length of the lower catalytic layer is taken as 100%. If such is the case, it is possible for Rh being loaded in the second upper catalytic layer to exhibit the $NO_x$ conversion capability effectively. Note that it is more preferable that the second upper catalytic layer's longitudinal proportion can fall in a range of from 71 to 81% with respect to the lower catalytic layer's overall length being taken as 100%.

In addition, it is preferable that the lower catalytic layer can further comprise an oxygen absorbing/releasing ingredient; and that the lower catalytic layer can be formed in a coating amount of from 105 to 155 g per 1 liter of the substrate. An oxygen absorbing/releasing ingredient exhibits an oxygen absorbing/releasing ability (or oxygen storage capacity, and may be hereinafter abbreviated to as "OSC"); namely, it stores oxygen therein in oxidizing atmosphere, and releases the stored oxygen therefrom in reducing atmosphere. The oxygen absorbing/releasing ingredient being included in the lower catalytic layer can keep the lower catalytic layer being held stably in environments that are adequate for the conversion reactions. When the lower catalytic layer, which further comprises an oxygen absorbing/releasing ingredient, is formed in an amount that falls in such a range as above, it is possible to retain the lower catalytic layer in environments that have appropriate oxygen concentrations. As a result, it is possible for the lower catalytic layer to effectively show the capabilities of converting exhaust gases that result from Pd and/or Pt to be loaded therein. Note that it is preferable that the lower catalytic layer can further comprise an oxygen absorbing/releasing ingredient in an amount of from 50 to 90% by mass with respect to the entire lower catalytic layer being taken as 100% by mass.

Moreover, the lower catalytic layer that is formed in a coating amount of from 105 to 155 g per 1 liter of the substrate can provide the catalyst for converting exhaust gases according to the present invention with such an ample opening area for securely making gas-flow passages that keeps the pressure loss down to the minimum, while maintaining the OSC adequately.

In addition, it is preferable that the first upper catalytic layer can comprise $Al_2O_3$ on which Pd is loaded, and an oxygen absorbing/releasing ingredient that is free from loaded Pd. In this instance, it is more preferable that $Al_2O_3$ can make a support for loading Pd thereon, and the resulting support for loading Pd cannot include any oxygen absorbing/releasing ingredient at all. As a result, the first upper catalytic layer exhibits an enhanced capability of converting HC in exhaust gases at low temperatures. Moreover, the first upper first catalytic layer including an oxygen absorbing/releasing ingredient alleviates the fluctuations of atmospheres on the upstream side of the catalyst for converting exhaust gases according to the present invention. Hence, the oxygen absorbing/releasing ingredient can inhibit the catalytic ingredient (e.g., Rh) being loaded in the second upper catalytic layer from degrading.

Moreover, it is preferable that the oxygen absorbing/releasing ingredient making the first upper catalytic layer can comprise $CeO_2$ in an amount of from 30 to 60% by mass when the entirety of the oxygen absorbing/releasing ingredient is taken as 100% by mass. In that instance, it is possible for the resultant oxygen absorbing/releasing ingredient to exhibit the oxygen absorbing/releasing ability more effectively.

The catalyst for converting exhaust gases according to the present invention comprises catalytic ingredients, which are loaded so as to be present on suitable parts or regions in the substrate depending on types of the respective catalytic ingredients; and comprises the first upper catalytic layer in which one of the catalytic ingredients is loaded in an amount falling in the predetermined range that is set greater than the loading amounts having been employed heretofore. Therefore, the present catalyst can not only demonstrate the conversion characteristics of the catalytic ingredients fully, but also can exhibit enhanced low-temperature conversion performance for exhaust gases as a whole.

MODES FOR CARRYING OUT THE INVENTION

Figure 1:
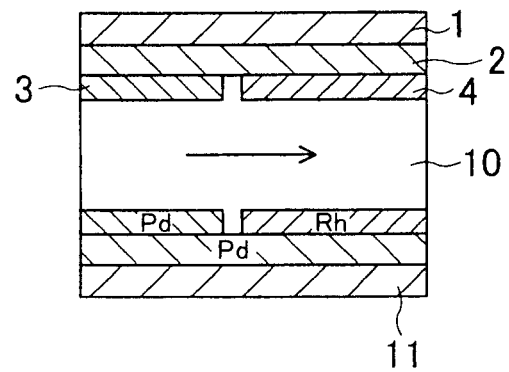
FIG. 1 is a cross-sectional view for illustrating a catalyst for converting exhaust gases according to Example No. 1 of the present invention.

A catalyst for purifying exhaust gases according to the present invention comprises a substrate, a lower catalytic layer, a first upper catalytic layer, and a second upper catalytic layer. The lower catalytic layer is formed on the substrate. The lower catalytic layer has a surface. The first upper catalytic layer is formed on the surface of the lower catalytic layer to cover the upstream side with respect to a flow of exhaust gases. The second upper catalytic layer is formed on the surface of the lower catalytic layer to cover the downstream side with respect to the flow of exhaust gases.

The substrate has a construction that makes a flow passage for exhaust gases. For example, it is possible to use those that have various configurations, such as honeycomb configurations, foam configurations and plate configurations, for the substrate. Although a material for making the substrate is not limited in particular, it is possible to make the substrate of materials that have been known publicly, such as ceramic (like cordierite ($Mg_2(Al_4Si_5O_{18})$), or silicon carbide (SiC)) and metals.

The lower catalytic layer comprises a support, and a catalytic ingredient being loaded on the support. The catalytic ingredient in the lower catalytic layer includes at least one member that is selected from the group consisting of palladium (Pd) and platinum (Pt). For example, it is allowable that the catalytic ingredient in the lower catalytic layer can include Pd alone; or Pt alone; or Pd and Pt. It is permissible that, in addition to Pd and Pt, the catalytic ingredient can further include the other catalytic ingredients, such as rhodium (Rh), as far as they do not adversely affect the capabilities of Pd and Pt.

Unless otherwise specified, the term, "per 1-liter substrate," signifies "per 1 liter of a whole apparent volume involving not only the true or pure volume of a substrate per se but also the volumes of openings or pores that are formed inside the substrate" in the present description. For example, when a substrate is provided with cells that are demarcated in the interior, "per 1-liter substrate" means 1 liter of a whole apparent volume of the substrate, that is, the true volume of the substrate proper plus the volumes of the pores therein. Moreover, masses of the respective components per 1-liter substrate might be abbreviated to as such an expression as "g/L."

It is allowable that the support for the lower catalytic layer can comprise an oxygen absorbing/releasing ingredient. Note that it is preferable that the oxygen absorbing/releasing ingredient can include ceria (or $CeO_2$). Although the concentration of oxygen in and around the lower catalytic layer is likely to decline, the support for the lower catalytic layer that comprises an oxygen absorbing/releasing ingredient, such as $CeO_2$, can keep the concentration of oxygen in and around the lower catalytic layer higher to a certain extent. As a result, the catalytic ingredients being loaded in the lower catalytic layer can exhibit upgraded catalytic capabilities.

The oxygen absorbing/releasing ingredient (e.g., $CeO_2$) can preferably be contained in the lower catalytic layer in an amount of from 21 to 30 g per 1-liter substrate. When the content of the oxygen absorbing/releasing ingredient is less than 21 g per 1-liter substrate, the oxygen absorbing/releasing ingredient might not possibly maintain the concentration of oxygen in the lower catalytic layer stably. When the content of the oxygen/releasing ingredient exceeds 30 g per 1-liter substrate, the lower catalytic layer might possibly exhibit lowered capability of converting $NO_x$.

The lower catalytic layer can preferably comprise a support that includes a $CeO_2$—$ZrO_2$ composite oxide in which $CeO_2$ and $ZrO_2$ are solved one another to make a solid solution. Since the granular growth of $CeO_2$ is inhibited in such a lower catalytic layer, it is possible to restrain the lower catalytic layer from exhibiting lowered OSC after being subjected to a durability test.

The lower catalytic layer can preferably be coated in an amount of from 105 to 155 g per 1-liter substrate. Moreover, the coating amount of the lower catalytic layer can more preferably fall in a range of from 150 to 155 g per 1-liter catalyst. When the coating amount of the lower catalytic layer is less than 105 g per 1-liter substrate, the resulting lower catalytic layer have such a thin thickness that the catalytic activities of Pd and/or Pt might possibly decline. When the coating amount of the lower catalytic layer is more than 155 g per 1-liter substrate, the resultant lower catalytic layer might possibly exhibit augmented pressure loss. Unless otherwise specified, the term, "coating amount," refers to "a converted value of mass that is found by converting a mass of the lower catalytic layer to be coated on a substrate into another mass of the lower catalytic layer to be coated on 1 liter of the substrate." Moreover, the term, "1 liter of the substrate," signifies "per 1 liter of a whole apparent volume involving not only the true or pure volume of the substrate per se but also the volumes of openings or pores that are formed inside the substrate."

The lower catalytic layer can preferably have a thickness of from 10 to 30 μm. The lower catalytic layer with such a thickness not only exhibits higher catalytic activities but also shows pressure loss that is kept from increasing.

The first upper catalytic layer comprises a support, and palladium (Pd) being loaded on the support. The Pd works as a catalytic ingredient to mainly convert HC in exhaust gases.

In the first upper catalytic layer, a concentration of loaded Pd falls in a range of from 4.5 to 12% by mass when the entirety of the first upper catalytic layer is taken as 100% by mass. Thus, the term, a "concentration of loaded Pd," refers to "a proportion of a mass of loaded Pd with respect to a whole mass of the first upper catalytic layer being coated on the lower catalytic layer." As described above, the first upper catalytic layer, and the second upper catalytic layer are present adjacently or one after another on the lower catalytic layer. Accordingly, in the catalyst for converting exhaust gases according to the present invention, the first upper catalytic layer involving Pd has a shorter length than that of the lower catalytic layer. Consequently, the lower catalytic layer comes to comprise a part, which is provided with a smaller volume than those conventional ones are, for enabling Pd to react with exhaust gases. That is, in the present catalyst, the first upper catalytic exhibits a concentration of loaded Pd that is made higher than having been set up heretofore in order that loaded Pd can convert HC highly efficiently in a smaller reactive space.

Moreover, it is preferable that the concentration of loaded Pd can fall in a range of from 6 to 10% by mass when the entirety of the first upper catalytic layer is taken as 100% by mass. When the loaded-Pd concentration is the preferable range's lower limit or more, the resulting first upper catalytic layer exhibits more enhanced capability of converting HC due to the loaded Pd. When the loaded-Pd concentration is the preferable range's upper limit or less, it is possible to keep the material cost for producing the present catalyst from going up.

In addition, the first upper catalytic layer can preferably have a length that exhibits a proportion of from 20 to 40%, more preferably, from 30 to 35%, with respect to a whole length of the lower catalytic layer. If so, it is possible to securely provide the lower catalytic layer with a space for disposing the second upper catalytic layer on the downstream side that is more downstream than where the first upper catalytic layer is present. Accordingly, it is possible to enhance the first upper catalytic layer in the capability of converting HC, while enabling Rh being loaded in the second upper catalytic layer to show the capability of converting $NO_x$ fully. Note herein that the term, "length," refers to a length of a substrate in the direction of a stream of exhaust gases. For example, when a substrate has a honeycomb structure, the term, "length," signifies a length of the substrate in the longitudinal direction. When the proportion of the first upper catalytic layer's length is less than 20% with respect to the lower catalytic layer's entire length, the resulting catalyst might possibly show lowered HC conversion performance, because the absolute amount of Pd has become less in the first upper catalytic layer. When the proportion of the first upper catalytic layer's length is more than 40% with respect to the lower catalytic layer's entire length, the resultant catalyst might possibly exhibit lowered exhaust-gas conversion performance due to Rh, because the space or allowance for forming the second upper catalytic layer is so small that the loading amount of Rh has decreased in the second upper catalytic layer. Consequently, when the proportion of the first upper catalytic layer's length falls in the more preferable range of from 30 to 35% with respect to the lower catalytic layer's entire length, it is possible to furthermore enhance the first upper catalytic layer in the capability of converting HC, while having the second upper catalytic layer show the capability of converting $NO_R$, which results from the loaded Rh, more fully.

The first upper catalytic layer can preferably be formed in a coating amount of from 30 to 50 g, more preferably from 40 to 50 g, per 1-liter substrate. When the coating amount of the first upper catalytic layer is less than 30 g per 1-liter substrate, the workability might possibly worsen in coating the first upper catalytic layer onto the substrate with the lower catalytic layer formed. On the other hand, when the first upper catalytic layer is formed in a coating amount exceeding 50 g per 1-liter substrate, it might be difficult to raise the first upper catalytic layer's temperature in a short period of time because the resulting first upper catalytic layer exhibits a heat capacity that has become too great, and thereby it probably might not be easy for the resultant first upper catalytic layer to convert HC in low-temperature regions.

The first upper catalytic layer can preferably have a thickness of from 10 to 30 μm. If such is the case, not only the absolute amount of Pd, namely, an amount of Pd that is enough for converting HC, can be secured, but also the resulting first upper catalytic layer can raise the temperature quickly at the time of cold-starting engine because it exhibits a reduced heat capacity.

It is allowable for the support, which makes the first upper catalytic layer and on which Pd is loaded, to include $Al_2O_3$, and an oxygen storing/releasing ingredient. It is desirable, however, that the support for loading Pd thereon can comprise $Al_2O_3$ but can be free from any oxygen absorbing/releasing ingredient. The desirable setting enables the first upper catalytic layer to exhibit a much higher capability of converting HC at the time of cold-starting engine.

It is allowable that the first upper catalytic layer can preferably comprise $Al_2O_3$ on which Pd is loaded, and an oxygen absorbing/releasing ingredient on which no Pd is loaded. It is permissible that the support for loading Pd thereon can comprise $Al_2O_3$ but can be free from any oxygen absorbing/releasing ingredient. When an oxygen absorbing/releasing ingredient makes one of the constituent elements of a support for loading Pd thereon, it is believed that the oxygen absorbing/releasing ingredient is less likely to promote the combustion of HC due to Pd at the time of low temperatures, because oxygen, which the oxygen absorbing/releasing ingredient working as the support for loading Pd thereon has given off, is more likely to react with CO in exhaust gases than with HC in the exhaust gases.

Note that an oxygen absorbing/releasing ingredient on which no Pd is loaded does not operate as a support for loading Pd thereon at all. Fluctuations of the atmospheres around the catalyst for converting exhaust gases according to the present invention are relaxed by the presence of an oxygen absorbing/releasing ingredient on which no Pd is loaded in the first upper catalytic layer. Accordingly, it is possible for Rh, which is loaded in the downstream-side second or trailing upper catalytic layer, to convert the components of exhaust gases in stabilized environments. Consequently, the second upper catalytic layer exhibits upgraded catalytic capabilities resulting from Rh. Also note that an oxygen absorbing/releasing ingredient on which no Pd is loaded does not have any adverse influence at all on the first upper catalytic layer's capability of converting HC at the time of low temperatures.

It is preferable that the first upper catalytic layer can preferably contain an oxygen absorbing/releasing ingredient in an amount of from 5 to 18 g per 1-liter substrate. When the first upper catalytic layer includes an oxygen absorbing/releasing ingredient in such a preferable content, the first upper catalytic layer exhibits the capability of absorbing and releasing oxygen due to the oxygen absorbing/releasing agent effectively, keeps atmospheres for oxidizing and reducing exhaust gases from fluctuating at high temperature, and then inhibits Rh, which is loaded in the second upper catalytic layer, from deteriorating. Note that it is more preferable that the first upper catalytic layer can contain an oxygen absorbing/releasing ingredient in an amount of from 10 to 14 g per 1-liter substrate.

The oxygen absorbing/releasing ingredient being set forth in the present description refers to such components that absorb oxygen when they are put in oxygen-rich atmospheres and release oxygen when they are put in oxygen-poor atmospheres. As for such an oxygen absorbing/releasing ingredient, it is possible to name $CeO_2$ and $CeO_2$—$ZrO_2$, for instance. It is allowable that the oxygen absorbing/releasing ingredients can be stabilized with an oxide of rare-earth elements. As the rare-earth elements that make such an oxide, the following are available: scandium (Sc), yttrium (Y), lanthanum (La), praseodymium (Pd), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu). Of these rare-earth elements, it is permissible that La or Nd can make an oxide for stabilizing $CeO_2$ and $CeO_2$—$ZrO_2$. Moreover, it is allowable that the absorbing/releasing ingredients can further comprise iridium (Ir), one of the elements in the platinum group.

It is more preferable that an oxygen absorbing/releasing ingredient that the first upper catalytic layer includes can comprise $CeO_2$ in an amount of from 30 to 60% by mass when the entirety of the oxygen absorbing/releasing ingredient is taken as 100% by mass.

The second upper catalytic layer comprises a support, and rhodium (Rh) being loaded on the support. The Rh works as a catalytic ingredient to principally convert $NO_x$ in exhaust gases.

It is allowable that the second upper catalytic layer can further comprise another catalytic ingredient, such as Pd, to such an extent that the other catalytic ingredient does not impair the capabilities of Rh. However, it is permissible that the second upper catalytic layer can be free from Pt in order to prevent Rh from alloying with Pt, because Rh has exhibited degraded catalytic capabilities if Pt is present to alloy with Rh.

The second upper catalytic layer can preferably have a thickness of from 10 to 30 μm. If such is the case, not only since the resulting second upper catalytic layer exhibits a better capability of converting $NO_x$ due to Rh being loaded therein, but also since the resultant second upper catalytic layer shows a better capability of diffusing exhaust gases down into the lower catalytic layer, it is possible for the lower catalytic layer to exhibit enhanced catalytic capabilities resulting from Pd and/or Pt being loaded therein.

The second upper catalytic layer can preferably have a length that exhibits a proportion of from 70 to 85%, more preferably, from 71 to 81%, with respect to a whole length of the lower catalytic layer. If so, it is possible to load Rh in the second upper catalytic layer in such an amount that is enough for converting $NO_x$ in exhaust gases, while securely providing the lower catalytic layer with a space for disposing the first upper catalytic layer on the upstream side that is more upstream than where the second upper catalytic layer is present. As a result, it is possible to enhance the first upper catalytic layer in the capability of converting HC, while making it possible to load Rh in the second upper catalytic layer in such an ample amount that enables the loaded Rh to show the capability of converting $NO_x$ fully.

In the second upper catalytic layer, it is preferable that a concentration of loaded Rh can fall in a range of from 0.1 to 0.4% by mass when the entirety of the second upper catalytic layer is taken as 100% by mass. When the concentration of loaded Rh is less than 0.1% by mass with respect to the entire mass of the second upper catalytic layer, the resulting second upper catalytic layer might possibly exhibit a degraded capability of converting $NO_x$ due to Rh. When the concentration of loaded Rh is more than 0.4% by mass with respect to the entire mass of the second upper catalytic layer, it might not possible to expect the resultant second upper catalytic layer to show the capabilities of converting exhaust gases that can commensurate with such an increased concentration of loaded Rh. Moreover, heightening the concentration of loaded Rh as such might possibly result in raising the cost for manufacturing the catalyst for purifying exhaust gases according to the present invention.

The second upper catalytic layer can preferably be formed in a coating amount of from 50 to 200 g, more preferably from 66 to 90 g, per 1-liter substrate. Since this setting augments an absolute amount of loaded Rh in the second upper catalytic layer, the resulting second upper catalytic layer exhibits an enhanced capability of converting $NO_x$ due to Rh, while inhibiting the resultant second upper catalytic layer from leading to pressure loss.

The downstream end of the second upper catalytic layer is put in place right above the downstream end of the lower catalytic layer. Likewise, the upstream end of the first upper catalytic layer is put in place right above the upstream end of the lower catalytic layer. Moreover, the second upper catalytic layer can also have an upstream-side section that is separated away from a downstream-side section of the first upper catalytic layer. In addition, the second upper catalytic layer can even have an upstream-side section that overlaps with a downstream-side section of the first upper catalytic layer. In the case of latter, it is also allowable that the second upper catalytic layer's upstream-side section can cover a surface of the first upper catalytic layer's downstream-side section. Conversely, it is even permissible that the second upper catalytic layer's upstream-side section can be covered with the first upper catalytic layer's downstream-side section. For example, it is preferable that a leading section of the second upper catalytic layer can cover a trailing section of the first upper catalytic layer by a length that exhibits a proportion of 25% or less, more preferably from 10 to 25%, when the entire length of the lower catalyst is taken as 100%.

In order to form the lower catalytic layer on the substrate, the following options are available for the production: a slurry comprising a support powder can be wash coated on a surface of the substrate, and then the resulting wash-coated layer can be loaded with a catalytic ingredient comprising Pd and/or Pt; or a catalytic power, which is made by loading a catalytic ingredient on a support powder in advance, can be turned into a slurry, and then the resultant slurry can be wash coated onto the support.

Moreover, when forming the first upper catalytic layer on a surface of the lower catalytic layer, the first upper catalytic layer can be formed by the following methods of production optionally. For example, it is possible to wash coat a slurry comprising a support powder onto an upstream-side section of the lower catalytic layer, and then to load the resulting wash-coated layer with Pd. Alternatively, it is possible to turn a catalytic power, on which Pd has been loaded on a support powder in advance, into a slurry, and then to wash coat the resultant slurry onto the lower catalytic layer's upstream-side section.

In addition, the second upper catalytic layer can be formed on another surface of the lower catalytic layer by wash coating a slurry comprising a support powder onto a downstream-side section of the lower catalytic layer, and then loading the resulting wash-coated layer with Rh. Instead of this, the second upper catalytic layer can be formed by turning a catalytic power, on which Rh has been loaded on a support powder in advance, into a slurry, and then wash coating the resultant slurry onto the lower catalytic layer's downstream-side section.

The catalyst for purifying exhaust gases according to the present invention can be used as a three-way catalyst, for instance. A three-way catalyst operates as a catalyst that simultaneously converts HC, CO and $NO_x$ in exhaust gases emitted from vehicle by means of oxidation and reduction.

The catalyst for converting exhaust gases according to the present invention will be hereinafter described in detail with reference to examples and comparative examples.

EXAMPLE NO. 1

As illustrated in FIG. 1, a catalyst for converting exhaust gases according Example No. 1 of the present invention comprised a substrate 1, and a catalytic layer 10. The catalytic layer 10 was formed on the substrate 1, and comprised a lower catalytic layer 2, a first upper catalytic layer 3 and a second upper catalytic layer 4. The lower catalytic layer 2 was formed on the face of the substrate 1 directly. The first upper catalytic layer 3 was formed on an upstream-side section in the face of the lower catalytic layer 2. The second upper catalytic layer 4 was formed on a downstream-side section in the face of the lower catalytic layer 2.

Figure 2:
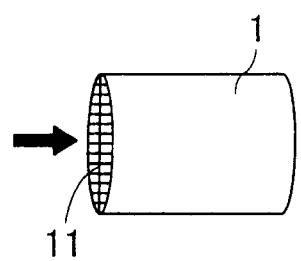
FIG. 2 is a perspective view for illustrating a substrate according to Example No. 1.

As illustrated in FIG. 2, the substrate 1 was a monolithic substrate that was made of cordierite and had a honeycomb structure. Moreover, the substrate 1 had a circular cross section whose diameter was 103 mm, had an overall length of 105 mm, and had a whole volume of 875 c.c. In addition, the substrate 1 comprised cellular walls 11 that demarcated the inside of the substrate 1 into a large number of cells. The cells made gas passages, which enabled exhaust gases to flow through the substrate 1, respectively. Moreover, as shown in FIG. 1, the lower catalytic layer 2 was formed directly on the face of the cellular walls 11 that demarcated the cells. In addition, the face of the lower catalytic layer 2 was provided with the first upper catalytic layer 3 on the upstream side, and was provided with the second upper catalytic layer 4 on the downstream side.

The lower catalytic layer 2 comprised $Al_2O_3$, Pd, and an oxygen absorbing/releasing ingredient. The lower catalytic layer 2 was coated in an amount of 111 g/L. Specifically, the $Al_2O_3$ was coated in an amount of 25 g/L. The Pd was loaded in the lower catalytic layer 2 in an amount of 1.0 g/L. The oxygen absorbing/releasing ingredient was made of $CeO_2$, and was coated in an amount of 85 g/L. Note that the Pd was loaded on each of the $Al_2O_3$ and $CeO_2$.

The first upper catalytic layer 3 comprised $Al_2O_3$, Pd, and an oxygen absorbing/releasing ingredient. The Pd was loaded in the first upper catalytic layer 3 in an amount of 1.73 g/L; that is, the first upper catalytic layer 3 exhibited a loaded-Pd concentration of 5.8% by mass when the entire mass of the first upper catalytic layer 3 was taken as 100% by mass. The first upper catalytic layer 3 was coated in an exact or absolute amount of 30 g; that is, the absolute coated amount could be converted into 34.3 g/L (i.e., 34.3 g per 1-liter substrate). The $Al_2O_3$ in the first upper catalytic layer 3 was coated in an amount of 18.6 g/L (i.e., 18.6 g per 1-liter substrate). The oxygen absorbing/releasing ingredient was made of $CeO_2$, and was coated in an amount of 5.0 g/L (i.e., 5.0 g per 1-liter substrate). Note that a ratio of the coated-$Al_2O_3$ amount to the coated-$CeO_2$ amount was 3.7. Moreover, the Pd was loaded on the $Al_2O_3$ and the $CeO_2$, respectively.

The second upper catalytic layer 4 comprised $Al_2O_3$, Rh, and an oxygen absorbing/releasing ingredient. The Rh in the second upper catalytic layer 4 was loaded in an amount of 0.2 g/L (i.e., 0.2 g per 1-liter substrate). The second upper catalytic layer 4 was coated in an exact or absolute amount of 92.3 g; that is, the absolute coated amount could be converted into 105.5 g/L (i.e., 105.5 g per 1-liter substrate). The $Al_2O_3$ in the second upper catalytic layer 4 was coated in an amount of 75.2 g/L (i.e., 75.2 g per 1-liter substrate). The oxygen absorbing/releasing ingredient was made of $CeO_2$, and was coated in an amount of 30.1 g/L (i.e., 30.1 g per 1-liter substrate). Note that a ratio of the coated-$Al_2O_3$ amount to the coated-$CeO_2$ amount was 2.5. Moreover, the Rh was loaded on each of the $Al_2O_3$ and $CeO_2$.

The lower catalytic layer 2 had a length of 105 mm, an identical length with that of the substrate 1. The first upper catalytic layer 3 was formed from the upstream end of the lower catalytic layer 2 toward the downstream side so as to terminate at a position away from the upstream end by 31.5 mm. On the contrary, the second upper catalytic layer 4 was formed from the downstream end of the lower catalytic layer 2 toward the upstream side so as to terminate at a position away from the downstream end by 84 mm. Specifically, the first upper catalytic layer 3 had a length of 31.5 mm, and the second upper catalytic layer 4 had a length of 84 mm. Note that the leading end of the second upper catalytic layer 4 covered the trailing end of the first upper catalytic layer 3 by a length of 10.5 mm.

The lower catalytic layer 2 had a thickness of 20 µm. The first upper catalytic layer 3, and the second upper catalytic layer 4 had a thickness of 20 µm, respectively.

The catalyst for converting exhaust gases according to Example No. 1 of the present invention was produced in the following manner. A support powder was first immersed in an aqueous solution of palladium nitrate, and was then calcined to load palladium on the support powder. The support powder comprised an $Al_2O_3$ powder, and a $CeO_2$ powder. The support powder with palladium loaded was mixed with an $Al_2O_3$ binder to make a slurry. The resulting slurry was wash coated onto the substrate 1. The wash-coated slurry was dried, and was then calcined to form the lower catalytic layer 2.

Subsequently, another support powder was first immersed in another aqueous solution of palladium nitrate, and was then calcined to load palladium on the support powder. The support powder comprised an $Al_2O_3$ powder, and a $CeO_2$ powder. The support powder with palladium loaded was mixed with another $Al_2O_3$ binder to make another slurry. The resulting slurry was wash coated onto a surface of the lower catalytic layer 2 in the upstream-side section. The wash-coated slurry was dried, and was then calcined to form the first upper catalytic layer 3. Finally, still another support powder was first immersed in still another aqueous solution of rhodium nitrate, and was then calcined to load rhodium on the support powder. The support powder comprised an $Al_2O_3$ powder, and a $CeO_2$ powder. The support powder with rhodium loaded was mixed with still another $Al_2O_3$ binder to make still another slurry. The resulting slurry was wash coated onto another surface of the lower catalytic layer 2 in the downstream-side section. The wash-coated slurry was dried, and was then calcined to form the second upper catalytic layer 4.

EXAMPLE NO. 2

A catalyst for converting exhaust gases according to Example No. 2 of the present invention comprised a first upper catalytic layer 3 in which loaded Pd accounted for 8.8% by mass of the first upper catalytic layer 3' whole mass being taken as 100% by mass. Moreover, the first upper catalytic layer 3 was formed in an exact or absolute coating amount of 20 g (i.e., 22.9 g per 1-liter substrate). In addition, the first upper catalytic layer 3 had a length of 21 mm. In other words, the catalyst according to Example No. 2 comprised a first upper catalytic layer 3 in which Pd was loaded in the same amount as that in the first upper catalytic layer 3 of the catalyst according to Example No. 1, and which was formed in a reduced coating amount that was less than that in the first upper catalytic layer 3 of the catalyst according to Example No. 1. As a result, in the catalyst according to Example No. 2, not only the first upper catalytic layer 3 exhibited an increased concentration of loaded Pd, but also the first upper catalytic layer 3 had a shortened length. Note that, except for the first upper catalytic layer 3, the catalyst according to Example No. 2 comprised the same constituent elements as those of the catalyst according to Example No. 1. Moreover, the leading of the second upper catalytic layer 4 coincided with the trailing end of the first upper catalytic layer 3.

COMPARATIVE EXAMPLE NO. 1

Figure 3:
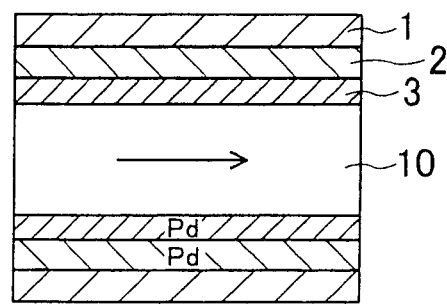
FIG. 3 is a cross-sectional view for illustrating a catalyst for converting exhaust gases according to Comparative Example No. 1.

A catalyst for converting exhaust gases according to Comparative Example No. 1 comprised a first upper catalytic layer 3 in which loaded Pd accounted for 1.8% by mass of the first upper catalytic layer 3' whole mass being taken as 100% by mass. Moreover, the first upper catalytic layer 3 was formed in an exact or absolute coating amount of 100 g (i.e., 114 g per 1-liter substrate) . In addition, the first upper catalytic layer 3 had a length of 105 mm. Accordingly, the first upper catalytic layer 3 comprised Pd in the same loading amount as that in the first upper catalytic layer 3 of the catalyst according to Example No. 1, and was formed in an increased coating amount that was greater than that in the first upper catalytic layer 3 of the catalyst according to Example No. 1. Consequently, the catalyst according to Comparative Example No. 1 comprised the first upper catalytic layer 3 that not only exhibited a decreased concentration of loaded Pd that was less than that the first upper catalytic layer 3 exhibited in the catalyst according to Example No. 1 but also had an identical length with that of the lower catalytic layer 2. Thus, in the catalyst according to Comparative Example No. 1, the first upper catalytic layer 3 covered the entire surface of the lower catalytic layer 2 fully; and no second upper catalytic layer was formed on the lower catalytic layer 2, as illustrated in FIG. 3. Note that, except for the first upper catalytic layer 3 and being free from the second upper catalytic layer 4, the catalyst according to Comparative Example No. 1 comprised the same constituent elements as those of the catalyst according to Example No. 1.

COMPARATIVE EXAMPLE NOS. 2 AND 3

A catalyst for converting exhaust gases according to Comparative Example No. 2 comprised a first upper catalytic layer 3 in which loaded Pd accounted for 3.5% by mass of the first upper catalytic layer 3' whole mass being taken as 100% by mass. Moreover, the first upper catalytic layer 3 was formed in an exact or absolute coating amount of 50 g (i.e., 57.1 g per 1-liter substrate). In addition, the first upper catalytic layer 3 had a length of 52.5 mm.

A catalyst for converting exhaust gases according to Comparative Example No. 3 comprised a first upper catalytic layer 3 in which loaded Pd accounted for 4.4% by mass of the first upper catalytic layer 3' whole mass being taken as 100% by mass. Moreover, the first upper catalytic layer 3 was formed in an exact or absolute coating amount of 40 g (i.e., 45.7 g per 1-liter substrate). In addition, the first upper catalytic layer 3 had a length of 42 mm.

Thus, the catalysts according to Comparative Example Nos. 2 and 3 comprised a first upper catalytic layer 3 in which Pd was loaded in the same amount as that in the first upper catalytic layer 3 of the catalyst according to Example No. 1, and which was formed in an increased coating amount that was greater than that in the first upper catalytic layer 3 of the catalyst according to Example No. 1. Therefore, in the catalysts according to Comparative Example Nos. 2 and 3, not only the first upper catalytic layer 3 exhibited a decreased concentration of loaded Pd, but also the first upper catalytic layer 3 had a prolonged length that was longer than that of the first upper catalytic layer 3 in the catalyst according to Example No. 1.

COMPARATIVE EXAMPLE NO. 4

A catalyst for converting exhaust gases according to Comparative Example No. 4 comprised a first upper catalytic layer 3 in which loaded Pd accounted for 17.5% by mass of the first upper catalytic layer 3' whole mass being taken as 100% by mass. Moreover, the first upper catalytic layer 3 was formed in an exact or absolute coating amount of 10 g (i.e., 11.4 g per 1-liter substrate). In addition, the first upper catalytic layer 3 had a length of 10.5 mm.

Thus, the catalyst according to Comparative Example No. 4 comprised a first upper catalytic layer 3 in which Pd was loaded in the same amount as that in the first upper catalytic layer 3 of the catalyst according to Example No. 1, and which was formed in a decreased coating amount that was less than that in the first upper catalytic layer 3 of the catalyst according to Example No. 1. Therefore, in the catalyst according to Comparative Example No. 4, not only the first upper catalytic layer 3 exhibited an increased concentration of loaded Pd, but also the first upper catalytic layer 3 had a shortened length that was shorter than that of the first upper catalytic layer 3 in the catalyst according to Example No. 1.

Note that, except for the first upper catalytic layer 3, the catalysts according to Comparative Example Nos. 2, 3 and 4 comprised the same constituent elements, the substrate 1, lower catalytic layer 2 and second upper catalytic layer 4, as those of the catalyst according to Example No. 1, respectively.

Measurement on Emission Amounts of Exhaust Gases

The catalysts according to Example Nos. 1 and 2, and the catalysts according to Comparative Example Nos. 1 through 4 were measured for the emission amounts of exhaust gases 8 (e.g., hydrocarbons (or HC)), respectively.

Figure 4:
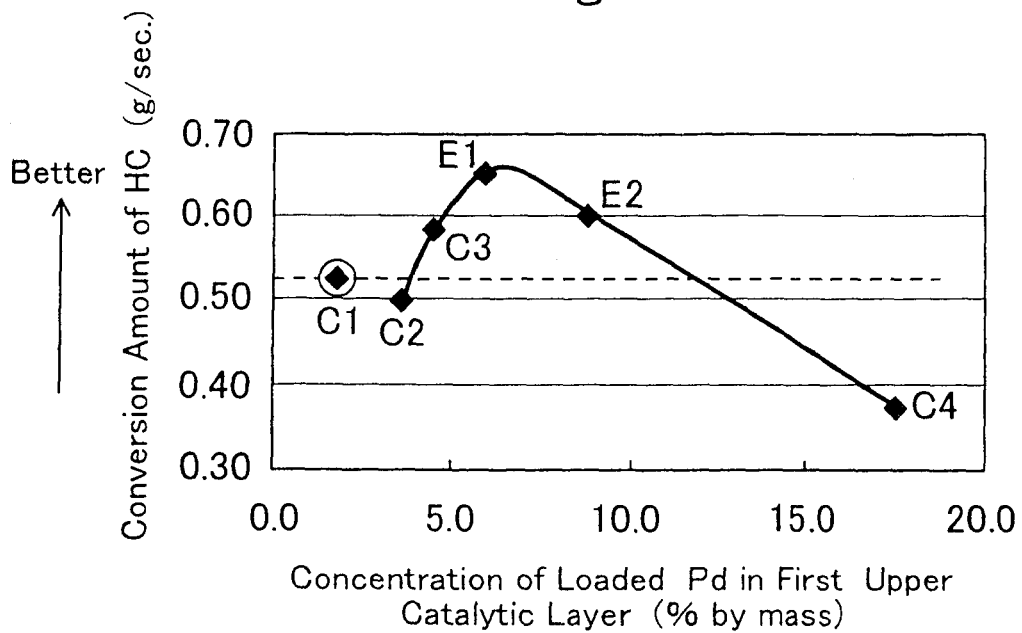
FIG. 4 is a diagram for illustrating a relationship between concentrations of loaded Pd in first upper catalytic layer and conversion amounts of HC.

First of all, each of the catalysts was exposed to a flow of exhaust gases that a V-shaped 8-cylindered engine emitted in order to subject each of the catalysts to a durability test that was executed at a catalyst bed temperature of 1,000° C. for 50 hours. Each of the catalysts that had experienced the durability test was installed under the floor of a vehicle that had an in-line four-cylindered engine with 2.4-L displacement on board. Then, the engine was operated while controlling the combustion at the theoretical or stoichiometric air-fuel ratio, and the resulting exhaust gases were flowed through each of the catalysts at an inlet gas temperature of 450° C. Concentrations of HC in the outlet gases that came, from out of the catalysts were detected, respectively. The detected concentrations of HC in the outlet gases were compared with concentrations of HC in the inlet gases to find conversion amounts of HC per one second. The results of this measurement are given in Table 1 and shown in FIG. 4. In FIG. 4, the horizontal axis represents the concentrations of loaded Pd, and the vertical axis represents the conversion amounts of HC. Moreover, in FIG. 4, Example Nos. 1 and 2 are designated with "E," and Comparative Example Nos. 1 through 4 are designated with "C," respectively. The designations are identical in subsequent FIG. 5.

Measurement on Pressure Losses Resulting from Catalysts

Figure 5:
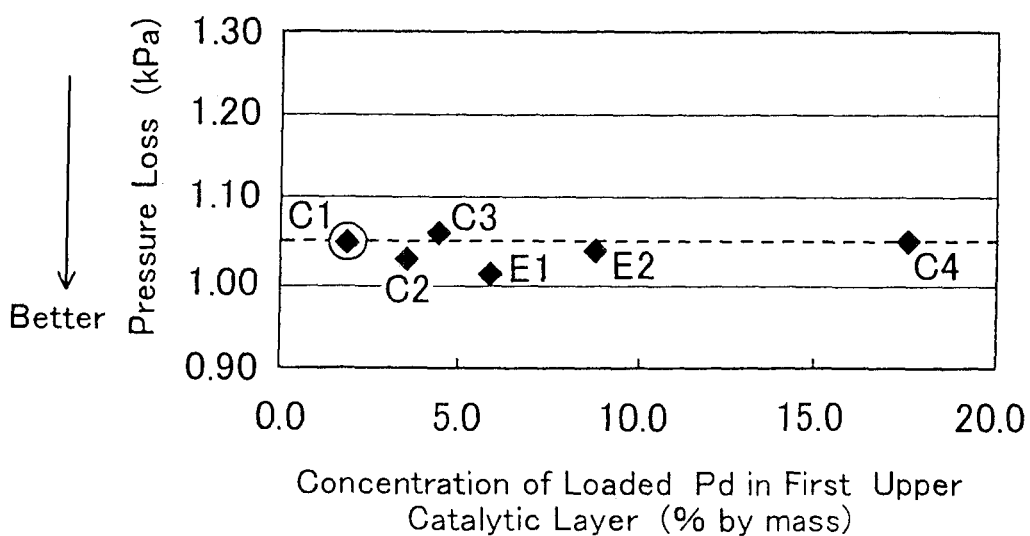
FIG. 5 is a diagram for illustrating a relationship between concentrations of loaded Pd in first upper catalytic layer and pressure losses.

Pressure losses, which resulted from the catalysts according to Example Nos. 1 and 2 and the catalysts according to Comparative Example Nos. 1 through 4, were measured, respectively. A gas was flowed through the catalysts from the upstream end to the downstream end at a flow volume of 5 m³/min. Pressures in the outlet gas were measured immediately behind the downstream end of the catalysts. Differences between the inlet-gas pressure and the outlet-gas pressures were found, and the resultant values were given in Table 1 and shown in FIG. 5 as the "pressure loss" arising from each of the catalysts. In FIG. 5, the horizontal axis represents the concentrations of loaded Pd, and the vertical axis represents the pressure losses.

TABLE 1

| | | Specifications of First Upper Catalytic Layer 3 | | | | | |
|---|---|---|---|---|---|---|---|
| Specification | Unit | Comp. Ex. No. 2 | Comp. Ex. No. 3 | Ex. No. 1 | Ex. No. 2 | Comp. Ex. No. 4 | Comp. Ex. No. 1 |
| Loaded-Pd Concentration | % by mass | 3.5 | 4.4 | 5.8 | 8.8 | 17.5 | 1.8 |
| Coated Amount | g | 50 | 40 | 30 | 20 | 10 | 100 |
| | g/L | 57 | 46 | 34 | 23 | 11 | 114 |
| Length | mm | 52.5 | 42 | 31.5 | 21 | 10.5 | 105 |

TABLE 1-continued

| Specification | Unit | Comp. Ex. No. 2 | Comp. Ex. No. 3 | Ex. No. 1 | Ex. No. 2 | Comp. Ex. No. 4 | Comp. Ex. No. 1 |
|---|---|---|---|---|---|---|---|
| | % | 50 | 40 | 30 | 20 | 10 | 100 |
| HC Conversion Amount | g/s | 0.49988 | 0.58566 | 0.64889 | 0.59869 | 0.3722 | 0.52433 |
| Pressure Loss | kPa | 1.03 | 1.06 | 1.01 | 1.04 | 1.05 | 1.05 |

Specifications of First Upper Catalytic Layer 3

Evaluation

According to the aforementioned results of the measurements, the catalysts according to Example Nos. 1 and 2 exhibited higher HC conversion amounts than the catalysts according to Comparative Example Nos. 1 through 4 did. The catalysts according to Comparative Example No. 1 showed lower performance of converting HC, because the concentration of loaded Pd was smaller in the first upper catalytic layer 3. Note that the higher the loaded Pd concentration in the first upper catalytic layer 3 was the more enhanced HC conversion performance the catalyst exhibited.

Especially, when the first upper catalytic layer 3 exhibited from 4.5 to 12% by mass in the concentration of loaded Pd, the catalysts exhibited favorable HC conversion amounts. When the concentration of loaded Pd fell in a range of from 5.8 to 8.8% by mass, the HC conversion amount was maximized; when the concentration of loaded Pd was more than 8.8% by mass, the HC conversion amount declined gradually. Moreover, the catalyst according to Comparative Example No. 4, which comprised the first upper catalytic layer 3 showing the concentration of loaded Pd that exceeded 12% by mass (17.5% by mass, for instance), exhibited a lower HC conversion amount than the catalysts according to Comparative Example Nos. 2 and 3 as well as Comparative No. 1 did, comparative examples which comprised the first upper catalytic layer 3 showing 3.5% by mass, 4.4% by mass and 1.8% by mass in the concentration of loaded Pd in this order. It is believed that the catalyst according to Comparative Example No. 4 could not exhibit the purifying capability of Pd fully because the concentration of loaded Pd was so great that an amount of the exhaust gases' components, which could make contact with per unit mass of Pd, had become less.

Moreover, the greater the concentration of loaded Pd increased in the first upper catalytic layer 3, the shorter the first upper catalytic layer 3 became in the length. In view of this, it is understood that the first upper catalytic layer 3 exhibits upgraded catalytic activities when it comprises loaded Pd in a concentration of from 4.5 to 12% by mass to the whole mass of the first upper catalytic layer 3 being taken as 100% by mass and has a length that shows a proportion of from 20 to 40% to the entire length of the lower catalytic layer 2 being taken as 100%. In addition, the first upper catalytic layer 3 is upgraded more in terms of the catalytic activities by shortening the length much more, such as the longitudinal proportion to the entire length of the lower catalytic layer 2 that falls in a range of from 30 to 35% to the entire length of the lower catalytic layer 2 being taken as 100%, and then loading Pd in a high concentration of from 4.5 to 12% by mass to the whole mass of the first upper catalytic layer 3 being taken as 100% by mass.

Regarding the pressure loss, all of the catalysts according to Example Nos. 1 and 2 as well as Comparative Example Nos. 1 through 4 produced results that were virtually equal to each other. The reason is believed to be as hereinafter described. Since the catalysts according to Example Nos. 1 and 2 as well as Comparative Example Nos. 1 through 4 comprised the first upper catalytic layer 3 that was formed in a fixed coating amount, they had the catalytic layers whose thicknesses were roughly identical with each other; that is, the summed thickness of the lower catalytic layer 2, the first upper catalytic layer 3 and second upper catalytic layer 4 that covered the substrate 1 were substantially equal to each other in the catalysts. Accordingly, the respective catalysts had the gas flow passages whose cross-sectional opening areas were substantially constant one another. Consequently, the catalysts exhibited pressure losses that were virtually equal to each other.

Examination No. 1 for Relationship Between Length of First Upper Catalytic Layer and Time for 50% HC Conversion The first upper catalytic layer 3 was formed in a coating amount that was changed variously, and the resulting catalysts were measured for the time for 50% HC conversion.

The catalysts were produced as described below. First of all, a slurry "A" for the lower catalytic layer 2 was prepared. Starting materials for preparing the slurry "A" were cerium nitrate, zirconium oxynitrate, lanthanum nitrate, and yttrium nitrate. The starting materials were dissolved in pure water, thereby obtaining a precursor solution with 0.3M concentration. Then, the resulting precursor solution was dropped into ammonium water that had been diluted with pure water. The resultant mixture solution was stirred with a homogenizer, and was then put in a centrifugal separator to remove the water content and collect precipitates alone. The resulting precipitates were crystallized by calcining them at 700° C. after drying and preliminarily calcining them. Thereafter, the resultant crystals were pulverized with a blender to make a powder. Thus, a powdery $CeO_2$—$ZrO_2$—$La_2O_3$—$Y_2O_3$ composite oxide was obtained. According to a composition analysis, the composite oxide comprised $CeO_2$ in an amount of 60% by mass, $ZrO_2$ in an amount of 30% by mass, $La_2O_3$ in an amount of 3%, and $Y_2O_3$ in an amount of 7% by mass.

Finally, the thus obtained $CeO_2$—$ZrO_2$—$La_2O_3$—$Y_2O_3$ composite oxide was mixed with Pd, $Al_2O_3$ with La added, $BaSO_4$ and an $Al_2O_3$ binder to finish the preparation of the slurry "A" for the lower catalytic layer 2. Note that the $CeO_2$—$ZrO_2$—$La_2O_3$—$Y_2O_3$ composite oxide, Pd, $Al_2O_3$ with La added, $BaSO_4$ and $Al_2O_3$ binder were weighed in such exact or absolute amounts that could be converted into 86 g/L (i.e., grams per 1-liter substrate, being the same hereinafter), 0.5 g/L, 40 g/L, 10 g/L and 3 g/L, respectively, in the completed lower catalytic layer 2.

Moreover, a slurry "B" for the first upper catalytic layer 3 was prepared. A $CeO_2$—$ZrO_2$—$La_2O_3$—$Pr_6O_{11}$ composite oxide serving as an oxygen storing/releasing ingredient was produced in the same manner as the $CeO_2$—$ZrO_2$'$La_2O_3$—$Y_2O_3$ composite oxide that was mixed in the slurry "A" for the lower catalytic layer 2 except that the following starting materials were used: ceriumnitrate, zirconium oxynitrate, lanthanum nitrate, and praseodymium nitrate. Moreover, the resulting $CeO_2$—$ZrO_2$—$La_2O_3$—$Pr_6O_{11}$ composite oxide was mixed with Pd, $Al_2O_3$ with La added, $BaSO_4$ and an $Al_2O_3$ binder to finish the preparation of the slurry "B" for the first upper catalytic layer 3. Note that the $CeO_2$—$ZrO_2$—$La_2O_3$—$Pr_6O_{11}$ composite oxide, Pd, $Al_2O_3$ with La added, $BaSO_4$ and $Al_2O_3$ binder were weighed in such exact or absolute amounts that could be converted into from 5 to 15 g/L (i.e., grams per 1-liter substrate, being the same hereinafter), 1.0 g/L, from 14 to 50 g/L, 7 g/L and 3 g/L, respectively, in the completed first upper catalytic layer 3.

In addition, a slurry "C" for the second upper catalytic layer 4 was prepared. Starting materials for preparing the slurry "C" were aluminum nitrate, cerium nitrate, zirconium oxynitrate, and lanthanum nitrate. The starting materials were dissolved in pure water, thereby obtaining a precursor solution with 0.3M concentration. Then, the resulting precursor solution was dropped into ammonium water that had been diluted with pure water. The resultant mixture solution was stirred with a homogenizer, and was then put in a centrifugal separator to remove the water content and collect precipitates alone. The resulting precipitates were crystallized by calcining them at 700° C. after drying and preliminarily calcining them. Thereafter, the resultant crystals were pulverized with a blender to make a powder. The thus obtained powder was a composite oxide powder in which first particles and second particles were mixed with each other on the order of primary particle. Note that the first particles comprised $CeO_2$-$ZrO_2$ composite oxides with La added and the second particles comprised $Al_2O_3$ with La added.

Meanwhile, neodymium nitrate was dissolved in water. The resulting neodymium nitrate aqueous solution was mixed with the composite oxide prepared as above, and the resultant mixture solution was stirred. After fully stirring the mixture solution, the resulting precipitates were dried and then calcined at 900° C. Thus, a powdery support was made. Note that the resulting powdery support comprised $Nd_2O_3$ that underwent segregation to appear on the superficial layers of the first and second particles.

The thus obtained powdery support was immersed in a rhodium nitrate aqueous solution, and was then calcined. Thus, rhodium was loaded on the support in an amount of 0.15 g per 1-liter support (i.e., 0.15 g/L). Moreover, the resulting support was mixed with $Al_2O_3$ with La added, and an $Al_2O_3$ binder to finish the preparation of the slurry "C" for the second upper catalytic layer 4. Note that the powdery support with loaded Rh, $Al_2O_3$ with La added, and $Al_2O_3$ binder were weighed in such exact or absolute amounts that could be converted into from 46 g/L (i.e., grams per 1-liter substrate, being the same hereinafter), 17 g/L and 3 g/L, respectively, in the completed second upper catalytic layer 4.

Figure 6:
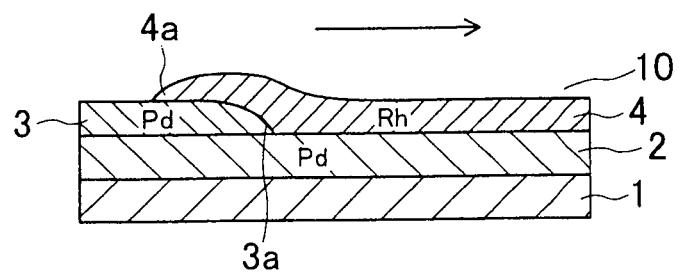
FIG. 6 is a cross-sectional view for illustrating a catalyst for converting exhaust gases according to Examination No. 1.

The thus prepared three slurries, the slurries "A," "B" and "C," were coated on a substrate. The substrate was identical with that of the catalyst according to Example No. 1. That is, the substrate was made of cordierite, had a honeycomb structure, and was formed as a cylindrical body with 103 mm diameter and 105 mm length. As illustrated in FIG. 6, the lower catalytic layer 2 was formed by coating, drying and then calcining the slurry "A" for the lower catalytic layer 2 on all over the entire surface of the substrate 1. Subsequently, the first upper catalytic layer 3 was formed by coating, drying and then calcining the slurry "B" for the first upper catalytic layer 3 on a preceding section in the surface of the lower catalytic layer 2. Note that the resulting first upper catalytic layer 3 had a length of 40 mm and accounted for 38% of the entire length of the lower catalytic layer 2. Finally, the second upper catalytic layer 4 was formed by coating, drying and then calcining the slurry "C" for the second upper catalytic layer 4 on a trailing section in the surface of the lower catalytic layer 2. Note that the resultant second upper catalytic layer 4 had a length of 85 mm and accounted for 81% of the entire length of the lower catalytic layer 2. Moreover, a downward face of an upstream section 4a in the second upper catalytic layer 4 covered an upward face of a downstream section 3a in the first upper catalytic layer 3.

The thus produced catalysts were subjected to a durability test. The durability test was carried out for 50 hours under a catalyst-bed temperature condition of 1,000° C. while exposing the catalysts to a flow of exhaust gases that a V-shaped eight-cylindered engine emitted.

Figure 7:
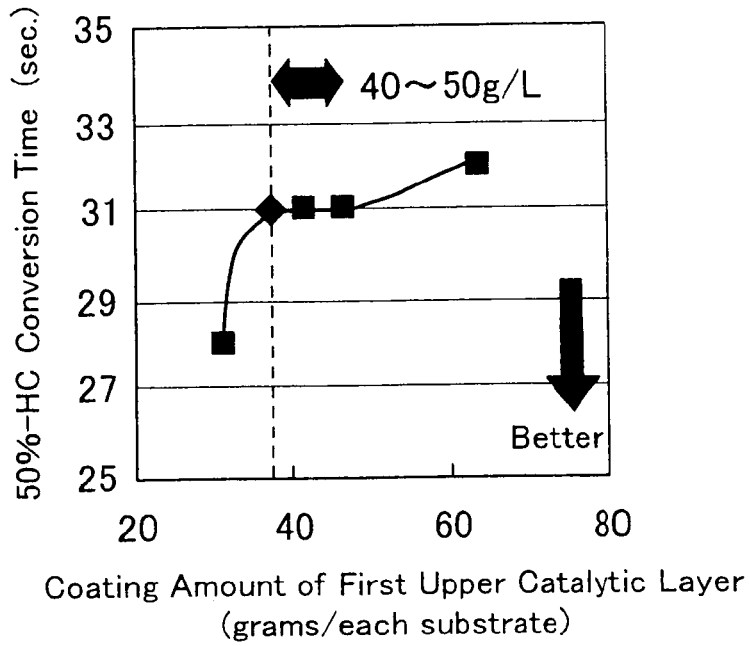
FIG. 7 is a diagram for illustrating a relationship between coating amounts of first upper catalytic layer and times for 50% HC conversion in Examination No. 1.

After being subjected to the durability test, the catalysts were cooled to room temperature, and were then measured for the HC conversions continuously while flowing exhaust gases through the catalysts at an inlet gas temperature of 400° C. Note that the exhaust gases resulted from an air-fuel mixture with a stoichiometric composition. Then, the catalysts were examined for the times that they could attain the 50% HC conversion (or the times for converting the total HC by 50%). FIG. 7 illustrates results of the calculation for the 50%-HC conversion times.

It is seen from FIG. 7 that the less the first upper catalytic layer 3 was in the coating amount the shorter the catalyst showed the time for 50% HC conversion. It is believed that the phenomenon occurred because the first upper catalytic layer 3 with a thinner thickness resulted in exhibiting such a smaller heat capacity that it could be heated up quickly by the waste of heat that came from the exhaust gases.

On the other hand, when the first upper catalytic layer 3 was formed in a coating amount of from 40 to 50 g/L, the catalysts showed the times for 50% HC conversion that did not change virtually, as represented in FIG. 7. However, when the coating amount of the first upper catalytic layer 3 exceeded 50 g/L, the catalyst showed the much longer time for 50% HC conversion, as specified in the drawing.

On the contrary, when the first upper catalytic layer 3 was formed in an amount of less than 40 g/L, it is less likely to form the first upper catalytic layer 3 in the fabrication. It was accordingly found out that, in order to satisfy both requirements for the catalytic performance and manufacturing conditions of the present catalyst for converting exhaust gases, it is allowable to prepare the slurry "B" for the first upper catalytic layer 3 in an amount of from 35 to 44 g per each of the substrates 1. Note that the preparation amount is equivalent to forming the first upper catalytic layer 3 in a coating amount of from 40 to 50 g per 1 liter of the substrate 1.

In Examination No. 1, the first upper catalytic layers 3 exhibited a loaded-Pd concentration of from 1.4 to 3.6% by mass with respect to the entire first upper catalytic layer 3 being taken as 100% by mass. However, even when the loaded-Pd concentration of the first upper catalytic layer 3 falls in a range of from 4.5 to 14% by mass, it is permissible to maintain that the first upper catalytic layer 3 can be formed in an amount of from 40 to 50 g/L because of the following facts. That is, regardless of the loaded-Pd concentration in the first upper catalytic layer 3, the less the coating amount of the first upper catalytic layer 3 is, the shorter the time for 50% HC conversion becomes. Moreover, it is more difficult to form the upper catalytic layer 3 in a smaller coating amount.

Examination No. 2 for Relationship Between Length of Second Upper Catalytic Layer and Catalytic Activities The second upper catalytic layer 4 was coated in a length that was changed variously, and the resulting catalysts were measured for the timed for 50% HC conversion, and for the $NO_x$ emission amounts.

A $CeO_2$—$ZrO_2$—$La_2O_3$—$Y_2O_3$ composite oxide, an oxygen absorbing/releasing ingredient, was prepared in the same manner as described in Examination No. 1, and accordingly exhibited the same compositional ratios as those of the $CeO_2$—$ZrO_2$—$La_2O_3$—$Y_2O_3$ composite oxide employed in that examination. Then, a slurry "A" for the lower catalytic layer 2 was prepared by mixing the resulting $CeO_2$—$ZrO_2$—$La_2O_3$—$Y_2O_3$ composite oxide with Pd, $Al_2O_3$ with La added, $BaSO_4$ and an $Al_2O_3$ binder. Note that the $CeO_2$—$ZrO_2$—$La_2O_3$—$Y_2O_3$ composite oxide, Pd, $Al_2O_3$ with La added, $BaSO_4$ and $Al_2O_3$ binder were weighed in such exact or absolute amounts that could be converted into 86 g/L (i.e., grams per 1-liter substrate, being the same hereinafter), 0.5 g/L, 30 g/L, 10 g/L and 3 g/L, respectively, in the completed lower catalytic layer 2.

Moreover, another $CeO_2$—$ZrO_2$—$La7O_3$—$Pr_6O_{11}$ composite oxide, another oxygen absorbing/releasing ingredient, was prepared in the same way as described in Examination No. 1, and accordingly exhibited the same compositional ratios as those of the $CeO_2$—$ZrO_2$—$La_2O_3$—$Pr_6O_{11}$ composite oxide employed in that examination. Then, a slurry "B" for the first upper catalytic layer 3 was prepared by mixing the resulting $CeO_2$—$ZrO_2$—$La_2O_3$—$Pr_6O_{11}$ composite oxide with Pd, $Al_2O_3$ with La added, $BaSO_4$ and an $Al_2O_3$ binder. Note that the $CeO_2$—$ZrO_2$—$La_2O_3$—$Pr_6O_{11}$ composite oxide, Pd, $Al_2O_3$ with La added, $BaSO_4$ and $Al_2O_3$ binder were weighed in such exact or absolute amounts that could be converted into 11 g/L, 1.0 g/L, 25 g/L, 7 g/L and 3 g/L, respectively, in the completed first upper catalytic layer 3.

In addition, a slurry "C" for the second upper catalytic layer 4 was prepared in the same manner as described in Examination No. 1. However, note that the powdery support and Rh accounted for 57 g/L and 0.15 g/L, respectively, in the completed second upper catalytic layer 4. Moreover, the $Al_2O_3$ with La added and $Al_2O_3$ binder were weighed in such exact or absolute amounts that could be converted into 17 g/L and 3 g/L, respectively, in the completed second upper catalytic layer 4. In addition, the powdery support was prepared in the same manner as described in Examination No. 1, and hence comprised first particles that were made of $CeO_2$—$ZrO_2$ composite oxide with La added, and second particles that were made of $Al_2O_3$ with La added, and each of the first and second particles had a superficial layer in which $Nd_2O_3$ underwent segregation was present.

The thus prepared three slurries, the slurries "A," "B" and "C," were coated on the substrate 1 in the same way as Examination No. 1. Specifically, the slurry "A" for the lower catalytic layer 2 was coated on all over the entire surface of the substrate 1 in a length of 105 mm. Moreover, the slurry "B" for the first upper catalytic layer 3 was coated on the lower catalytic layer 2 in a length of 35 mm from the inlet of the substrate 1, that is, it accounted for 33% of the overall length of the lower catalytic layer 2. In addition, the slurry "C" for the second upper catalytic layer 4 was coated on the lower catalytic layer 2 in a length of from 65 to 95 mm from the outlet of the substrate 1, that is, it accounted for from 62 to 91% of the overall length of the lower catalytic layer 2. Note that, in the resulting catalysts being produced thusly, the second upper catalytic layer 4 was formed in a varying coating amount that fell between 60 and 115 g/L by increasing or decreasing the coating amount of the powdery support with Rh loaded.

Figure 8:
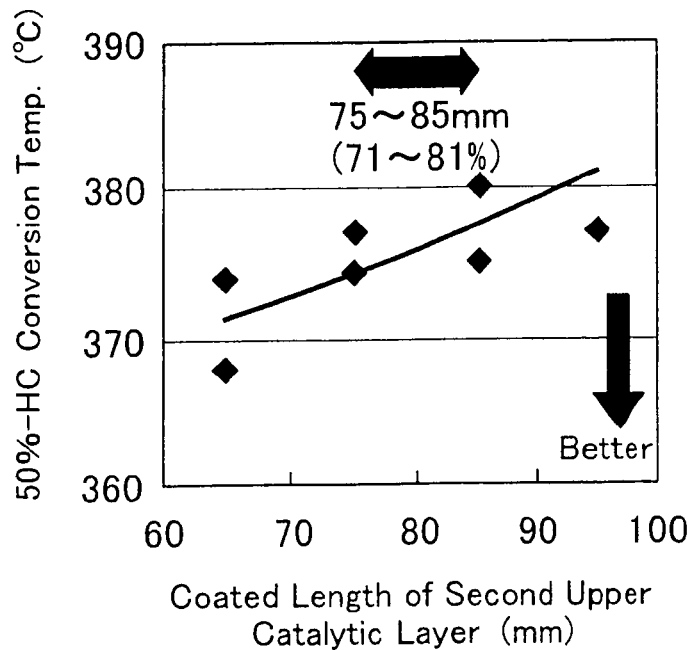
FIG. 8 is a diagram for illustrating a relationship between lengths of second upper catalytic layer and temperatures for 50% HC conversion in Examination No. 2.

The thus produced catalysts were subjected to a durability test that was executed in the same manner as described in Examination No. 1. The catalysts experienced the durability test were measured for temperatures at which they attained 50% FIC conversion (hereinafter being simply referred to as "50%-HO conversion temperatures"). Results of the measurement are illustrated in FIG. 8. Moreover, each of the catalysts was examined for the NO emission amount after the durability test.

It is seen from FIG. 8 that the shorter length the second upper catalytic layer 4 had the lower 50%-HO conversion temperature the catalyst exhibited.

In order to measure the respective catalysts for the NO emission amounts, the catalysts were put in an exhaust system in which exhaust gases flowed that were emitted by an engine. The exhaust gases were flowed through the catalysts under an ordinary reducing-atmosphere condition with 550° C. inlet-gas temperature. The $NO_x$ emission amounts in the outlet gases that came from out of the catalysts were detected. The $NO_x$ emission amounts that the catalysts exhibited are illustrated in FIG. 9.

Figure 9:
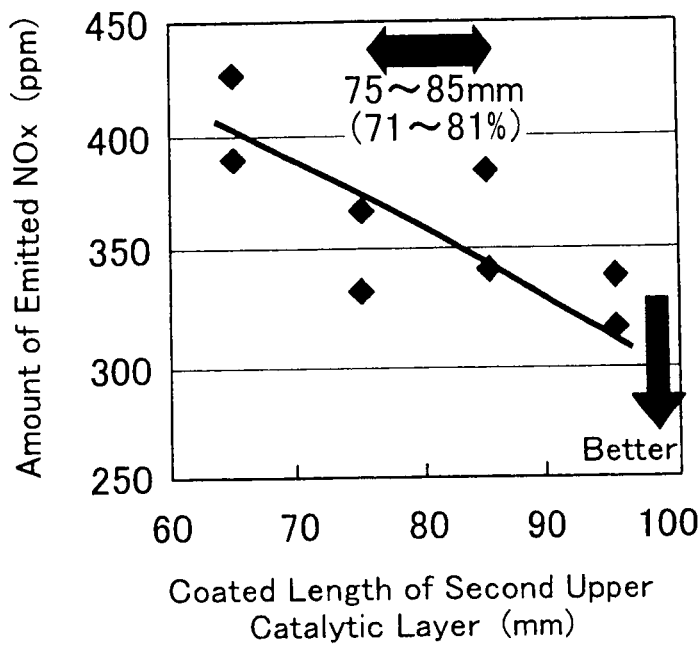
FIG. 9 is a diagram for illustrating a relationship between lengths of second upper catalytic layer and amounts of $NO_x$ emission in Examination No. 2.

It is seen from FIG. 9 that the longer the coated length of the second upper catalytic layer 4 was the less $NO_x$ emission amount the catalyst exhibited.

According to the results mentioned above, it is appreciated that the catalyst exhibits a lower 50%-HC conversion temperature and shows a less $NO_x$ emission amount when the upstream end of the second upper catalytic layer 4 is present right at the middle of the substrate 1 or lower catalytic layer 2, or in and around the middle, that is, when the second upper catalytic layer 4 has a coated length that accounts for from 70 to 85% approximately, or furthermore from 71 to 81% approximately, of the overall length of the lower catalytic layer 2.

Examination No. 3 for Relationship Between Coating Amount of Second Upper Catalytic Layer and $NO_x$ Emission Amount Catalysts for converting exhaust gases, catalysts which comprised the second upper catalytic layer 4 that was formed in a various coating amount, were measured for the $NO_x$ emission amounts.

The same $CeO_2$—$ZrO_2$—$La_2O_3$—$Y_2O_3$ composite oxide (i.e., an oxygen absorbing/releasing ingredient) as that was prepared in Examination No. 1 was used to prepare a slurry "A" for the lower catalytic layer 2. The $CeO_2$—$ZrO_2$—$La_2O_3$—$Y_2O_3$ composite oxide was mixed with Pd, $Al_2O_3$ with La added, $BaSO_4$ and an $Al_2O_3$ binder, thereby preparing the slurry "A." Note that the $CeO_2$—$ZrO_2$—$La_2O_3$—$Y_2O_3$ composite oxide, Pd, $Al_2O_3$ with La added, $BaSO_4$ and $Al_2O_3$ binder were used in such exact or absolute amounts that could be converted into 86 g/L (i.e., grams per 1-liter substrate, being the same hereinafter), 0.5 g/L, 40 g/L, 10 g/L and 3 g/L, respectively, in the completed lower catalytic layer 2.

Moreover, the same $CeO_2$—$ZrO_2$—$La_2O_3$—$Pr_6O_{11}$ composite oxide (i.e., an oxygen absorbing/releasing ingredient) as that was prepared in Examination No. 1 was used to prepare a slurry "B" for the first upper catalytic layer 3. The $CeO_2$—$ZrO_2$—$La_2O_3$—$Pr_6O_{11}$ composite oxide was mixed with Pd, $Al_2O_3$ with La added, $BaSO_4$ and an $Al_2O_3$ binder, thereby preparing the slurry "B." Note that the $CeO_2$—$ZrO_2$—$La_2O_3$—$Pr_6O_{11}$ composite oxide, Pd, $Al_2O_3$ with La added, $BaSO_4$ and $Al_2O_3$ binder were used in such exact or absolute amounts that could be converted into 11 g/L, 1.0 g/L, 25 g/L, 7 g/L and 3 g/L, respectively, in the completed first upper catalytic layer 3.

In addition, a slurry "C" for the second upper catalytic layer 4 was prepared in the same manner as described in Examination No. 1. However, note that the powdery support and Rh accounted for from 46 to 80 g/L and 0.15 g/L, respectively, in the completed second upper catalytic layer 4. Moreover, the $Al_2O_3$ with La added and $Al_2O_3$ binder were weighed in such exact or absolute amounts that could be converted into from 6 to 29 g/L and 3 g/L, respectively, in the completed second upper catalytic layer 4. In addition, as described in Examination No. 2, the powdery support comprised a $CeO_2$—$ZrO_2$ composite oxide with La added, $Al_2O_3$ with La added, and $Nd_2O_3$ underwent segregation; the $CeO_2$—$ZrO_2$ composite oxide with La added, the $Al_2O_3$ with La added, and the $Nd_2O_3$ made first particles, second particles, and the superficial layer in each of the first and second particles, respectively.

The thus prepared three slurries, the slurries "A," "B" and "C," were coated on the substrate 1 in the same way as Examination No. 1. Specifically, the slurry "A" for the lower catalytic layer 2 was coated on all over the entire surface of the substrate 1 in a length of 105 mm. Moreover, the slurry "B" for the first upper catalytic layer 3 was coated on the lower catalytic layer 2 in a length of 40 mm from the inlet of the substrate 1, that is, it accounted for 38% of the overall length of the lower catalytic layer 2. In addition, the slurry "C" for the second upper catalytic layer 4 was coated on the lower catalytic layer 2 in a length of 85 mm from the outlet of the substrate 1, that is, it accounted for 81% of the overall length of the lower catalytic layer 2. Note that, in the resulting catalysts being produced thusly, the second upper catalytic layer 4 was formed in a varying coating amount that fell between 60 and 115 g/L by increasing or decreasing the coating amount of the powdery support with Rh loaded.

The thus produced catalysts were subjected to a durability test that was executed in the same manner as described in Examination No. 1. The catalysts experienced the durability test were measured for the $NO_x$ emission amounts in the same way as described in Examination No. 2. Results of the measurement are illustrated in FIG. 10.

Figure 10:
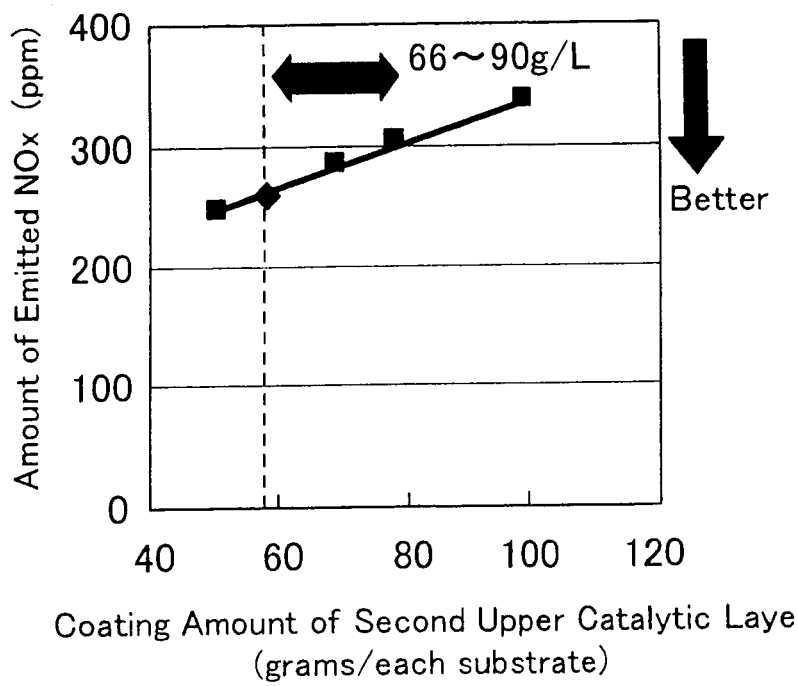
FIG. 10 is a diagram for illustrating a relationship between coating amounts of second upper catalytic layer and amounts of $NO_x$ emission in Examination No. 3.

It is seen from FIG. 10 that the catalysts exhibited the $NO_x$ emission amounts that decreased as the second upper catalytic layer 4 was formed in a lesser coating amount. On the other hand, it was less likely to form the second upper catalytic layer 4 in a coating amount of less than 60 g/L in the fabrication. It was accordingly found out that, in order to satisfy both requirements for the catalytic performance and manufacturing conditions of the present catalyst for converting exhaust gases, it is allowable to prepare the slurry "C" for the second upper catalytic layer 4 in an amount of from 57.8 to 78.8 g per each of the substrates 1. Note that the preparation amount is equivalent to forming the second upper catalytic layer 4 in a coating amount of from 66 to 90 g per 1 liter of the substrate 1.

Examination No. 4 for Relationship Between Coating Amount of Lower Catalytic Layer and OSC as Well as Pressure Loss Catalysts for converting exhaust gases, catalysts which comprised the lower catalytic layer 2 that was formed in a various coating amount, were examined for the capabilities, the OSC and pressure loss.

The same $CeO_2$—$ZrO_2$—$La_2O_3$—$Y_2O_3$ composite oxide as that was prepared in Examination No. 1 was used to prepare a slurry "A" for the lower catalytic layer 2. The $CeO_2$—$ZrO_2$—$La_2O_3$—$Y_2O_3$ composite oxide serving as an oxygen absorbing/releasing ingredient was mixed with Pd, $Al_2O_3$ with La added, $BaSO_4$ and an $Al_2O_3$ binder, thereby making the slurry "A." Note that the $CeO_2$—$ZrO_2$—$La_2O_3$—$Y_2O_3$ composite oxide, Pd, $Al_2O_3$ with La added, $BaSO_4$ and $Al_2O_3$ binder were used in such exact or absolute amounts that could be converted into from 69 to 120 g/L (i.e., grams per 1-liter substrate, being the same hereinafter), 0.5 g/L, from 29 to 40 g/L, 10 g/L and 3 g/L, respectively, in the completed lower catalytic layer 2.

Moreover, the same $CeO_2$—$ZrO_2$—$La_2O_3$—$Pr_6O_{11}$ composite oxide as that was prepared in Examination No. 1 was used to prepare a slurry "B" for the first upper catalytic layer 3. The $CeO_2$—$ZrO_2$—$La_2O_3$—$Pr_6O_{11}$ composite oxide serving as another oxygen absorbing/releasing ingredient was mixed with Pd, $Al_2O_3$ with La added, $BaSO_4$ and an $Al_2O_3$ binder, thereby making the slurry "B." Note that the $CeO_2$—$ZrO_2$—$La_2O_3$—$Pr_6O_{11}$ composite oxide, Pd, $Al_2O_3$ with La added, $BaSO_4$ and $Al_2O_3$ binder were used in such exact or absolute amounts that could be converted into 11 g/L, 1.0 g/L, 25 g/L, 7 g/L and 3 g/L, respectively, in the completed first upper catalytic layer 3.

In addition, a slurry "C" for the second upper catalytic layer 4 was prepared in the same manner as described in Examination No. 1. Note that the powdery support and Rh accounted for 57 g/L and 0.15 g/L, respectively, in the completed second upper catalytic layer 4. Moreover, the $Al_2O_3$ with La added and $Al_2O_3$ binder were weighed in such exact or absolute amounts that could be converted into 29 g/L and 3 g/L, respectively, in the completed second upper catalytic layer 4. In addition, as noted in Examination No. 2, the powdery support comprised first particles that were made of $CeO_2$—$ZrO_2$ composite oxide with La added, and second particles that were made of $Al_2O_3$ with La added, and each of the first and second particles had a superficial layer in which $Nd_2O_3$ underwent segregation was present.

The thus prepared three slurries, the slurries "A," "B" and "C," were coated on the substrate 1 in the same way as Examination No. 1. Specifically, the slurry "A" for the lower catalytic layer 2 was coated on all over the entire surface of the substrate 1 in a length of 105 mm. Moreover, the slurry "B" for the first upper catalytic layer 3 was coated on the lower catalytic layer 2 in a length of 40 mm from the inlet of the substrate 1, that is, it accounted for 38% of the overall length of the lower catalytic layer 2. In addition, the slurry "C" for the second upper catalytic layer 4 was coated on the lower catalytic layer 2 in a length of 85 mm from the outlet of the substrate 1, that is, it accounted for 81% of the overall length of the lower catalytic layer 2. Note that, in the resulting catalysts being produced thusly, the second upper catalytic layer 4 was formed in a varying coating amount that fell between 97 and 171 g/L by increasing or decreasing the coating amount of the powdery support with Rh loaded.

Figure 11:
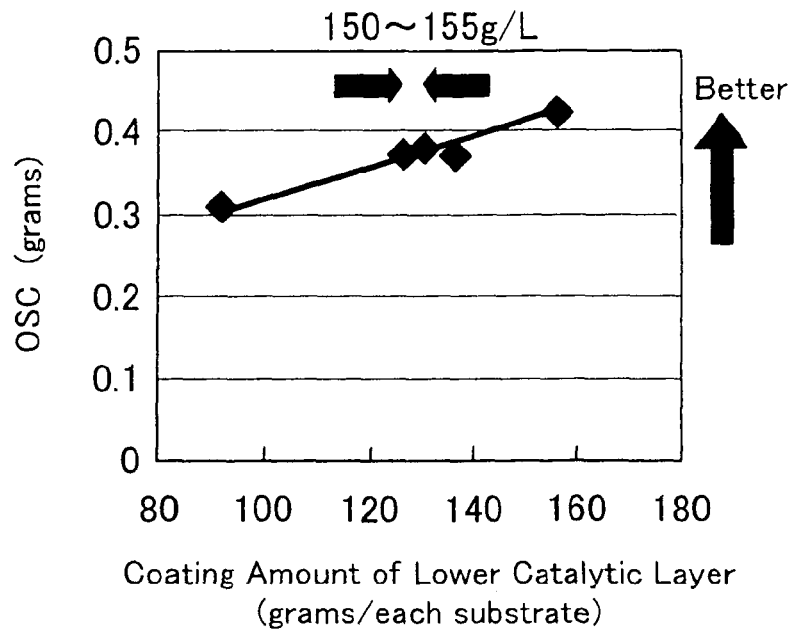
FIG. 11 is a diagram for illustrating a relationship between coating amounts of lower catalytic layer and OSCs in Examination No. 4.

The thus produced catalysts were subjected to a durability test that was executed in the same manner as described in Examination No. 1. Then, the catalysts experienced the durability test were examined for the OSCs and pressure losses. In order to measure the OSCs, the catalysts undergone the durability test were put in an exhaust system of an engine with displacement 2.4 L, respectively, and then oxygen concentrations in output gases from the exhaust system were measured continuously while supplying air-fuel mixtures whose air-fuel ratio (or A/F) varied between 14.1 and 15.1 to the engine and operating the catalysts at a catalyst-bed temperature of 450° C. The oxygen concentrations in the output gases, which were emitted from the exhaust system when the A/F was changed from a higher value to a lower value, were considered herein oxygen storage amounts, that is, the OSCs that the catalysts exhibited. The thus measured OSCs are illustrated in FIG. 11. Moreover, the catalysts were examined for the pressure losses in the same way as the catalysts according to Example Nos. 1 and 2 and Comparative Example Nos. 1 through 4 were examined. Results of the pressure-loss measurement are illustrated in FIG. 12.

As can be seen from FIG. 11, the catalysts exhibited the OSCs that were upgraded more as the lower catalytic layer 2 was formed in a greater coating amount. Since the lower catalytic layer 2 was formed in a fixed length, the lower catalytic layer 2 had a changing thickness as it was formed in a varying coating amount. Accordingly, the more the thickness of the lower catalytic layer 2 increased, the greater an absolute amount of the $CeO_2$—$ZrO_2$—$La_2O_3$—$Y_2O_3$ composite oxide augmented in the lower catalytic layer 2. Consequently, the catalysts exhibited increased absorbable/releasable oxygen amounts, that is, the upgraded OSCs.

Figure 12:
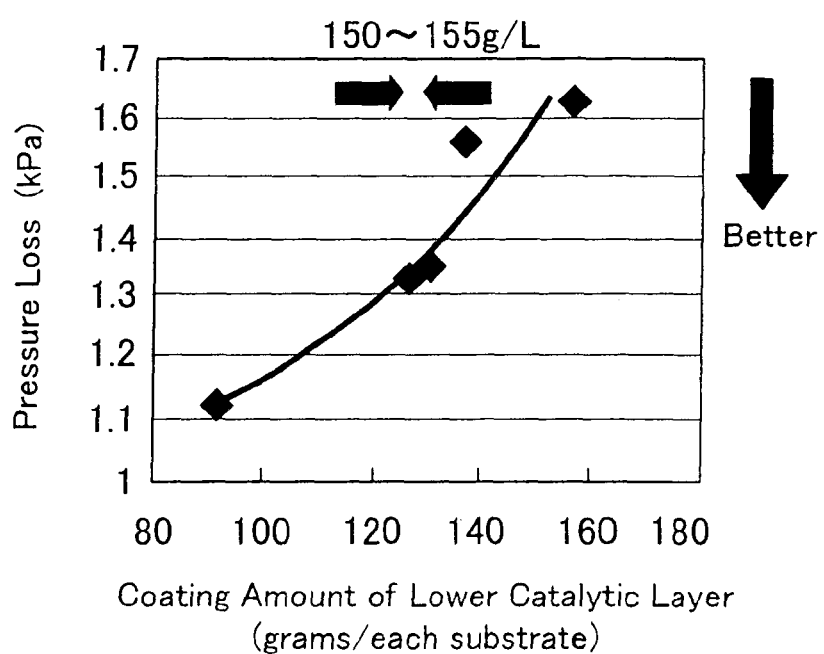
FIG. 12 is a diagram for illustrating a relationship between coating amounts of lower catalytic layer and pressure losses in Examination No. 4.

Moreover, as can be seen from FIG. 12, the catalysts showed increasing pressure losses as the lower catalytic layer 2 was formed in a greater coating amount. The phenomenon is believed to occur because the thickness of the lower catalytic layer 2 increased as being accompanied by the augmenting coating amount of the lower catalytic layer 2. As a result, the lower catalytic layer 2 had eventually come to reduce the resulting catalyst's gas flow passages in the cross-sectional opening area.

According to the evaluations on the OSCs and pressure losses that the catalysts exhibited, it is possible to say that the lower catalytic layer 2 can yield a better OSC and show a lower pressure loss when the lower catalytic layer 2 is formed in a coating amount that comes at around the middle of the coating amounts being examined as above, that is, a coating amount that falls in a range of from 105 to 155 g/L, more preferably, from 150 to 155 g/L.

Examination No. 5 for Relationship Between Coating Amount of Lower Catalytic Layer and 50%-HC Conversion Temperature as Well as OSC Catalysts for converting exhaust gases were prepared while forming the lower catalytic layer 2 in a various coating amount. Then, the resulting catalysts were examined for the 50%-HC conversion temperatures and OSCs.

Using the same $CeO_2$—$ZrO_2$—$La_2O_3$—$Y_2O_3$ composite oxide (i.e., an oxygen absorbing/releasing ingredient) as that was used in Examination No. 1, a slurry "A" for the lower catalytic layer 2 was prepared in the same manner as described in Examination No. 1. However, note that the slurry "A" was made up of the $CeO_2$—$ZrO_2$—$La_2O_3$—$Y_2O_3$ composite oxide, Pd, $Al_2O_3$ with La added, $BaSO_4$ and $Al_2O_3$ binder that were weighed in such exact or absolute amounts that could be converted into from 60 to 100 g/L (i.e., grams per 1-liter substrate, being the same hereinafter), 1.5 g/L, from 24 to 40 g/L, from 6 to 10 g/L and from 3 to 5 g/L, respectively, in the completed lower catalytic layer 2.

Moreover, using the same $CeO_2$—$ZrO_2$—$La_2O_3$—$Pr_6O_{11}$ composite oxide (i.e., another oxygen absorbing/releasing ingredient as that was used in Examination No. 1), a slurry "B" for the first upper catalytic layer 3 was prepared in the same way as described in Examination No. 1. However, note that the slurry "B" was made up of the $CeO_2$—$ZrO_2$—$La_2O_3$—$Pr_6O_{11}$ composite oxide, Pd, $Al_2O_3$ with La added, $BaSO_4$ and $Al_2O_3$ binder that were weighed in such exact or absolute amounts that could be converted into 35 g/L, 6.0 g/L, 77 g/L, 20 g/L and 10 g/L, respectively, in the completed first upper catalytic layer 3.

In addition, a slurry "C" for the second upper catalytic layer 4 was prepared in the same manner as described in Examination No. 1 by way of making the same powdery support with Rh loaded as that was used in Examination No. 1. However, note that the powdery support and Rh herein accounted for 55 g/L and 0.3 g/L, respectively, in the completed second upper catalytic layer 4. Moreover, the other two components of the slurry "C," the $Al_2O_3$ with La added and the $Al_2O_3$ binder, were weighed in such exact or absolute amounts that could be converted into 35 g/L and 4 g/L, respectively, in the completed second upper catalytic layer 4. In addition, as described in Examination No. 2, the powdery support comprised a $CeO_2$—$ZrO_2$ composite oxide with La added, $Al_2O_3$ with La added, and $Nd_2O_3$ underwent segregation; the $CeO_2$—$ZrO_2$ composite oxide with La added, the $Al_2O_3$ with La added, and the $Nd_2O_3$ made first particles, second particles, and the superficial layer in each of the first and second particles, respectively.

The thus prepared three slurries, the slurries "A," "B" and "C," were coated on the substrate 1 with 875 c.c. volume in the same way as Examination No. 1. Specifically, the slurry "A" for the lower catalytic layer 2 was coated on all over the entire surface of the substrate 1 in a length of 105 mm. Moreover, the slurry "B" for the first upper catalytic layer 3 was coated on the lower catalytic layer 2 in a length that accounted for 35% of the overall length of the substrate 1 (or that of the lower catalytic layer 2). In addition, the slurry "C" for the second upper catalytic layer 4 was coated on the lower catalytic layer 2 in a length that accounted for 80% of the overall length of the substrate 1 (or that of the lower catalytic layer 2). Note that, in the resulting catalysts being produced thusly, the lower catalytic layer 2 was formed in a varying coating amount that fell between 80 and 160 g/L by increasing or decreasing the coating amounts of the $CeO_2$—$ZrO_2$—$La_2O_3$—$Y_2O_3$ composite oxide, $Al_2O_3$ with La added, $BaSO_4$ and $Al_2O_3$ binder.

Figure 13:
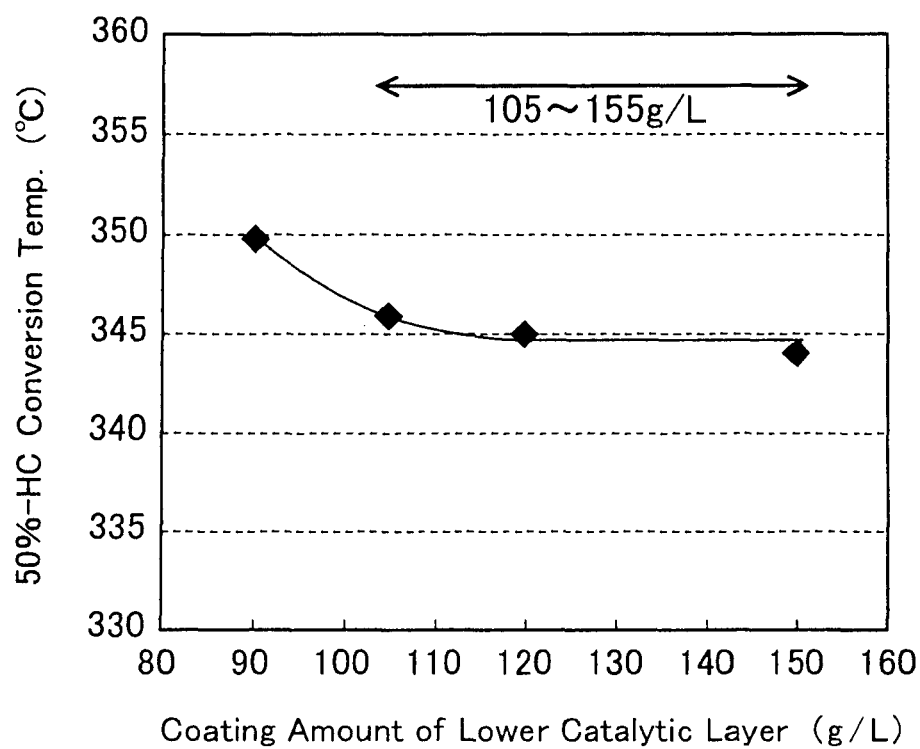
FIG. 13 is a diagram for illustrating a relationship between coating amounts of lower catalytic layer and temperatures for 50% HC conversion in Examination No. 5.
Figure 14:
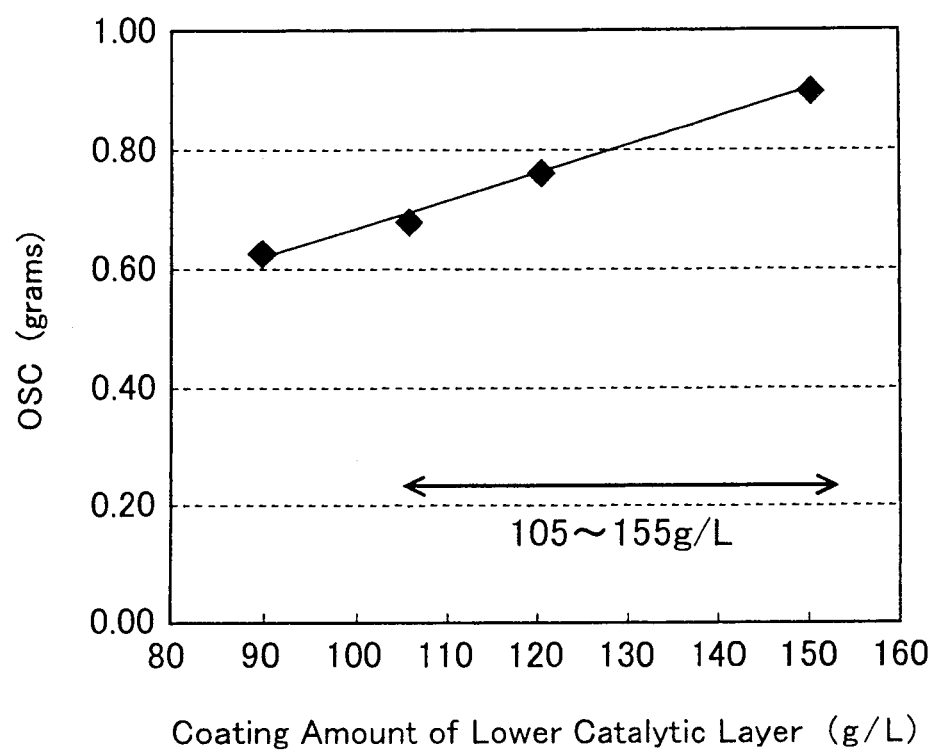
FIG. 14 is a diagram for illustrating a relationship between coating amounts of lower catalytic layer and OSCs in Examination No. 5.

A durability test was carried out for 50 hours while exposing the respective catalysts being fabricated as above to a flow of exhaust gases that a "3UZ-FE" type engine, one of V-shaped 8-cylindered engines with 4.3-liter displacement emitted and holding them at a catalyst bed temperature of 1,000° C. Then, the catalysts being subjected to the durability test were examined for the 50%-HC conversion temperatures and OSCs. Note that the 50%-HC conversions were measured in the same manner as being described in Examination No. 2. Results of the measurement are illustrated in FIG. 13. Moreover, the OSCs were measured in the same way as being described in Examination No. 4. Results of the measurement are shown in FIG. 14.

It is seen from FIG. 13 that the catalysts exhibited lower 50%-HC conversion temperatures, that is, they demonstrated better low-temperature conversion performance, when the lower catalytic layer 2 was formed in a coating amount of from 105 to 155 g/L. However, when the coating amount of the lower catalytic layer 2 was 90 g/L or less, the catalyst exhibited the higher 50%-HC conversion temperature, that is, it demonstrated degraded low-temperature conversion performance. On the other hand, it is seen from FIG. 14 that the more the coating amount of the lower catalytic layer 2 was decreased the poorer OSCs the catalysts tended to show. However, it has been ascertained separately by an extra evaluation using an actual vehicle that the catalysts comprising the lower catalytic layer 2, which is formed in a coating amount of from 105 to 155 g/L, exhibit OSCs that are free from problems.

According to the above results, it is understood that the lower catalytic layer 2 that is formed in a coating amount of 105 g/L or more shows better low-temperature conversion characteristics and has better OSC. Considering the results herein and the results according to aforesaid Examination No. 4 all together, it is possible to say that the lower catalytic layer 2 can preferably be formed in a coating amount of from 105 to 155 g/L, because the lower catalytic layer 2 that is formed in a coating amount of 155 g/L or less can result in exhibiting lower pressure loss.

Examination No. 6 for Relationship Between Composition of Support for First Upper Catalytic Layer and 50%-HC Conversion Time Catalysts for converting exhaust gases were fabricated in the following manner while changing the composition of a support for making the first upper catalytic layer 3. Note that Pd, a catalytic ingredient (one of the catalytic noble metals), was loaded on the resulting supports.

A slurry "B" for the first upper catalytic layer 3 comprised one of the supports with the compositions that are specified in Table 2 below. Table 2 gives five sorts of supports with five different compositions that are labeled Sample Nos. 1 through 5, respectively. Pd was first loaded on each of Sample Nos. 1 through No. 5. Note that each of the resulting five supports and Pd accounted for 25 g/L and 1.0 g/L, respectively, in the completed second upper catalytic layer 3. Then, the slurry "B" for the second upper catalytic layer 3 was prepared in five types by mixing the resultant five supports, on which Pd was loaded, with $BaSO_4$ and an $Al_2O_3$ binder, respectively. Note that the $BaSO_4$ and $Al_2O_3$ binder were weighed in such exact or absolute amounts that could be converted into 7 g/L and 3 g/L, respectively, in the completed second upper catalytic layer 3.

TABLE 2

| Sample No. | $CeO_2$ (% by mass) | $ZrO_2$ (% by mass) | $Al_2O_3$ (% by mass) | $R_2O_3$ (% by mass) |
|---|---|---|---|---|
| 1 | 60 | 30 | 0 | 10 |
| 2 | 30 | 60 | 0 | 10 |
| 3 | 25 | 25 | 45 | 5 |
| 4 | 20 | 70 | 0 | 10 |
| 5 | 0 | 0 | 96 | 4 |

(Note)
$R_2O_3$ represents $La_2O_3$, $Nd_2O_3$, $Y_2O_3$ and $Pr_2O_3$, for instance.

Moreover, a slurry "C" for the second upper catalytic layer 4 was prepared in the same manner as described in Examination No. 1 by way of making the same powdery support with Rh loaded as that was used in Examination No. 1. However, note that the powdery support and Rh herein accounted for 46 g/L and 0.15 g/L, respectively, in the completed second upper catalytic layer 4. Moreover, the other two components of the slurry "C," the $Al_2O_3$ with La added and the $Al_2O_3$ binder, were weighed in such exact or absolute amounts that could be converted into 17 g/L and 3 g/L, respectively, in the completed second upper catalytic layer 4. In addition, as noted in Examination No. 2, the powdery support comprised first particles that were made of $CeO_2$—$ZrO_2$ composite oxide with La added, and second particles that were made of $Al_2O_3$ with La added, and each of the first and second particles had a superficial layer in which $Nd_2O_3$ underwent segregation was present.

Figure 15:
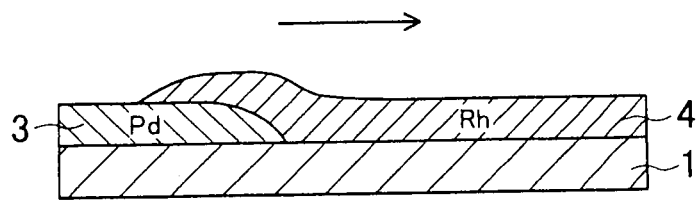
FIG. 15 is a cross-sectional view for illustrating a catalyst for converting exhaust gases that was used in Examination No. 6.

One of the five slurries "B" was selected and then combined with the slurry "C," that is, five sets of the slurry "B" and slurry "C" were coated onto a substrate, respectively, thereby making five types of catalysts for converting exhaust gases. Note that the substrate was a monolithic substrate that had 875 c.c. in volume and 105 mm in overall length. The slurries "B" for the first upper catalytic layer 3 were coated in a length of 37 mm, respectively, that accounted for 35% of the entire length of the monolithic substrate . Meanwhile, the slurry "C" for the second upper catalytic layer 4 was coated in a length of 85 mm that accounted for 81% of the entire length of the monolithic substrate. The slurries "B" were first wash coated onto the monolithic substrate and were then dried and calcined, respectively, thereby forming the first upper catalytic layer 3 in five sorts. Thereafter, the slurry "C" was coated onto the monolithic substrate and was then dried and calcined, thereby forming the second upper catalytic layer 4. As illustrated in FIG. 15, the thus fabricated catalysts for converting exhaust gases comprised the monolithic substrate 1, the first upper catalytic layer 3, and the second upper catalytic layer 4. Each of the first upper catalytic layers 3 was formed on a preceding section in the monolithic substrate 1. The second upper catalytic layer 4 was formed on a trailing section in the monolithic substrate 1. Note that a downward face of an upstream section in the second upper catalytic layer 4 covered an upward face of a downstream section in the first upper catalytic layer 3.

The thus produced catalysts were subjected to a durability test. In the durability test, the catalysts were exposed to a flow of exhaust gases, which a V-shaped 8-cylindered engine emitted, for 25 hours while holding the catalyst-bed temperature at 1,000° C.

Figure 16:
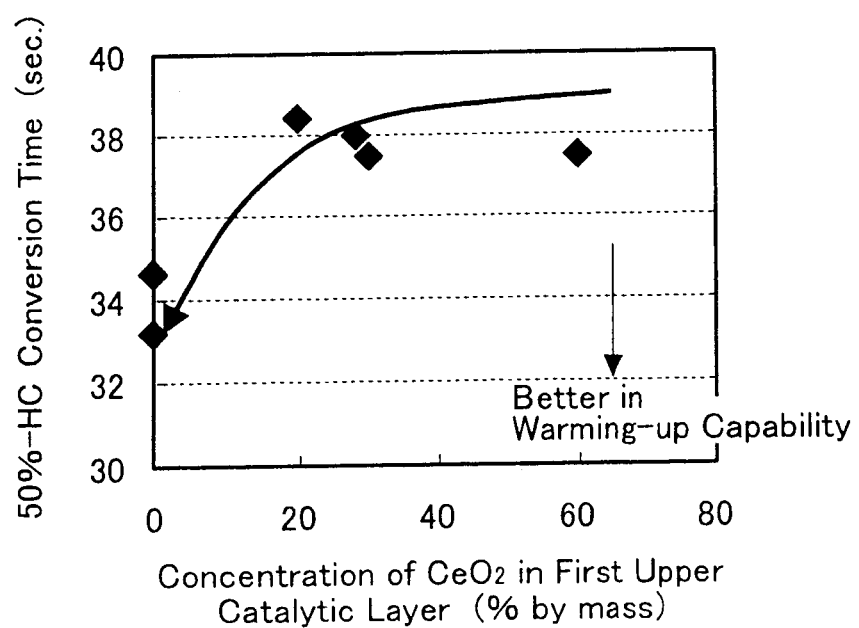
FIG. 16 is a diagram for illustrating a relationship between concentrations of $CeO_2$ in support, which was used for first upper catalytic layer, and times for 50% HC conversion in Examination No. 6.

After the catalysts had experienced the durability test, the catalysts were examined for the 50%-HC conversion times in the same manner as described in Examination No. 1. FIG. 16 illustrates results of the measurement. Note that FIG. 16 shows a relationship between the 50%-HC conversion times and the $CeO_2$ concentrations in the supports that were used to make the five first upper catalytic layers 3. It is understood from FIG. 16 that the catalysts exhibited the shorter 50%-HC conversion times as the $CeO_2$ concentrations became lower. In particular, when the $CeO_2$ concentration was 20% by mass or less, the catalysts showed the 50%-HC conversion times that were shortened remarkably. In other words, in order that the catalyst exhibits better HC conversion performance upon cold starting engine, it is preferable that the support for making the first upper catalytic layer 3 can comprise $CeO_2$ in a lower concentration, and it is more preferable that the support can be free from $CeO_2$. The phenomenon is believed to arise from the fact that oxygen that $CeO_2$ releases has lowered Pd in terms of the efficiency in combusting HC, because the oxygen is used more in the oxidation of CO in exhaust gases than it is used in the reactions of oxidizing HC therein. Note herein that the support according to Sample No. 5 was free from $CeO_2$ but comprised $Al_2O_3$ that was stabilized by basic oxides such as $La_2O_3$. Consequently, it is believed that the support according to Sample No. 5 has a high superficial area even at high temperatures of 1,000° C. or more, and can help Pd, one of the catalytic noble metals, exhibit the catalytic capabilities fully.

Examination No. 7 for Relationship Between Presence or Absence of Oxygen Absorbing/Releasing Ingredient in First Upper Catalytic Layer and Catalytic Capabilities Catalysts for converting exhaust gases were evaluated for how they exhibited catalytic capabilities when they comprised the first upper catalytic layer 3 that included an oxygen absorbing/releasing ingredient, and when they comprised the first upper catalytic layer 3 that was free from any oxygen absorbing/releasing ingredient.

A slurry "B1" for the first upper catalytic layer 3 that included an oxygen absorbing/releasing ingredient was prepared as follows: Pd was loaded onto a support that included $Al_2O_3$ and $R_2O_3$ in the same compositional proportions as those of the support according to Sample No. 5 given in Table 2 above; and then the resulting support with Pd loaded was mixed with a $CeO_2$—$ZrO_2$—$La_2O_3$—$Pr_6O_{11}$ composite oxide (i.e., oxygen absorbing/releasing ingredient), $BaSO_4$ and an $Al_2O_3$ binder. Note that the slurry "El" was made up of the support, Pd, $CeO_2$—$ZrO_2$—$La_2O_3$—$Pr_6O_{11}$ composite oxide, $BaSO_4$ and $Al_2O_3$ binder that were weighed in such exact or absolute amounts that could be converted into 25 g/L, 1.0 g/L, 11 g/L, 7 g/L and 3 g/L, respectively, in the completed first upper catalytic layer 3. Moreover, the $CeO_2$—$ZrO_2$—$La_2O_3$—$Pr_6O_{11}$ composite oxide comprised $CeO_2$, $ZrO_2$, $La_2O_3$ and $Pr_6O_{11}$ in compositional proportions of 60% by mass, 30% by mass, 3% by mass and 7% by mass, respectively.

Except that a slurry "B2" for the first upper catalytic layer 3 that was free from any oxygen absorbing/releasing ingredient did not include the $CeO_2$—$ZrO_2$—$La_2O_3$—$Pr_6O_{11}$ composite oxide that served as an oxygen absorbing/releasing ingredient, the slurry "B2" was identical with the slurry "B1."

Moreover, a slurry "A" for the lower catalytic layer 2 was the same as the slurry "A" according to Example No. 1. In addition, a slurry "C" for the second upper catalytic layer 4 was identical with the slurry "C" according to Examination No. 6.

One of the slurries "B1" and "B2" was selected and then combined with the slurry "A" and slurry "C," and the other one of the slurries "B1" and "B2" was selected and then combined with the slurry "A" and slurry "C." The resulting two sets of slurries, that is, the slurries "A," "B1" and "C" as well as the slurries "A," "B2" and "C," were coated onto a substrate, respectively, thereby making two catalysts for converting exhaust gases. Note that the substrate was a monolithic substrate with 875-c.c. volume and 105-mm overall length that was identical with the one used in Examination No. 6. The slurry "A" for the lower catalytic layer 2 was coated in a length that was equal to the entire length of the monolithic substrate. The slurry "B1" and the slurry "B2" were coated in a length of 37 mm, respectively. The slurry "C" was coated in a length of 85 mm. The lower catalytic layer 2 was formed by coating, drying and then calcining the slurry "A" on all over the entire surface of the monolithic substrate. Subsequently, the first upper catalytic layer 3 was formed by coating, drying and then calcining the slurry "B1" or "B2" on a preceding section in the surface of the lower catalytic layer 2. Finally, the second upper catalytic layer 4 was formed by coating, drying and then calcining the slurry "C" on a trailing section in the surface of the lower catalytic layer 2. As illustrated in FIG. 6, the lower catalytic layer 2 covered the outward face of the monolithic substrate 1 entirely. The first upper catalytic layer 3 covered the lower catalytic layer 2 on the upstream side. The second upper catalytic layer 4 covered the lower catalytic layer 2 on the downstream side. Note that a downward face of an upstream section 4a in the second upper catalytic layer 4 covered an upward face of a downstream section 3a in the first upper catalytic layer 3.

The thus prepared two catalysts for converting exhaust gases were subjected to a durability test that was executed for a time period of 50 hours, 150 hours and 200 hours. During the durability test, the two catalysts were exposed to a flow of exhaust gases, which a V-shaped 8-cylindered engine emitted, while holding the catalyst-bed temperature at 1,000° C.

Figure 17:
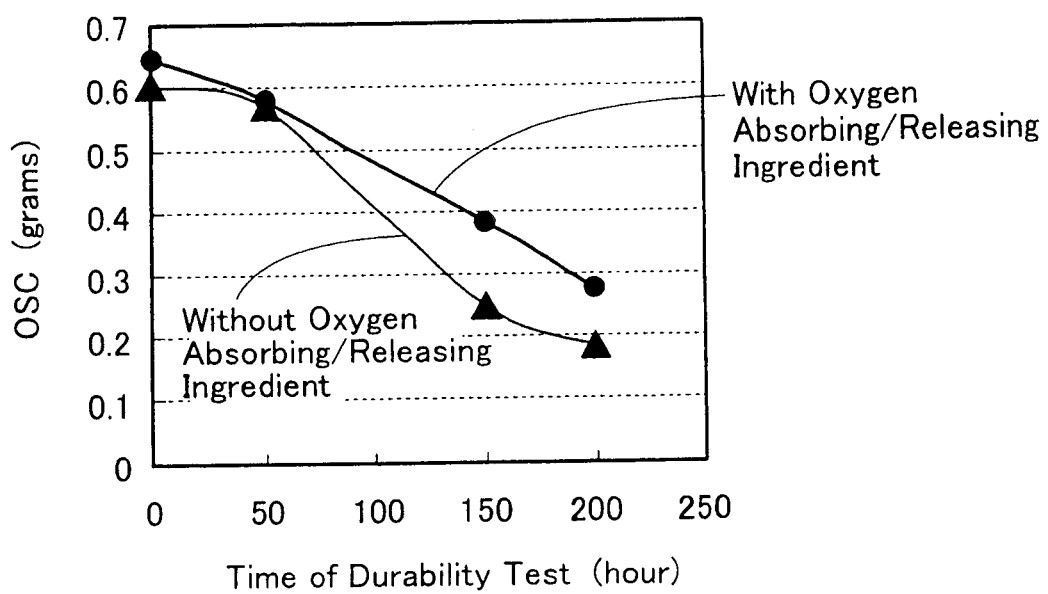
FIG. 17 is a diagram for illustrating relationships between an instance where an oxygen absorbing/releasing ingredient was present in first upper layer catalytic layer, another instance where no oxygen absorbing/releasing ingredient was present therein, and OSCs in Examination No. 7.

FIG. 17 illustrates a comparison between the catalyst comprising the first upper catalytic layer 3 that included the oxygen absorbing/releasing ingredient and the other catalyst comprising the first upper catalytic layer 3 that was free from any oxygen absorbing/releasing ingredient in terms of the OSCs with the periods of time that they underwent the durability test. The OSCs were measured in the following way. The catalysts experienced the durability test were put in an exhaust system of an engine with displacement 2.4 L, respectively. Then, oxygen concentrations in output gases from the exhaust system were measured continuously. Note herein that air-fuel mixtures with an air-fuel ratio (or A/F) that varied between 14.1 and 15.1 were supplied to the engine. Moreover, the catalysts were operated at a catalyst-bed temperature of 450° C. In addition, oxygen storage amounts, that is, the OSCs that the catalysts exhibited, were in how much concentrations oxygen accounted for the output gases that were emitted from the exhaust system when the A/F was changed from a higher A/F value to a lower one. FIG. 17 illustrates OSCs that were thus evaluated.

As shown in FIG. 17, the catalyst comprising the first upper catalytic layer 3 with an oxygen absorbing/releasing ingredient was declined less than the catalyst comprising the first upper catalytic layer 3 being free from any oxygen absorbing/releasing ingredient in terms of the OSC when the durability test was executed for a longer period of time.

Figure 18:
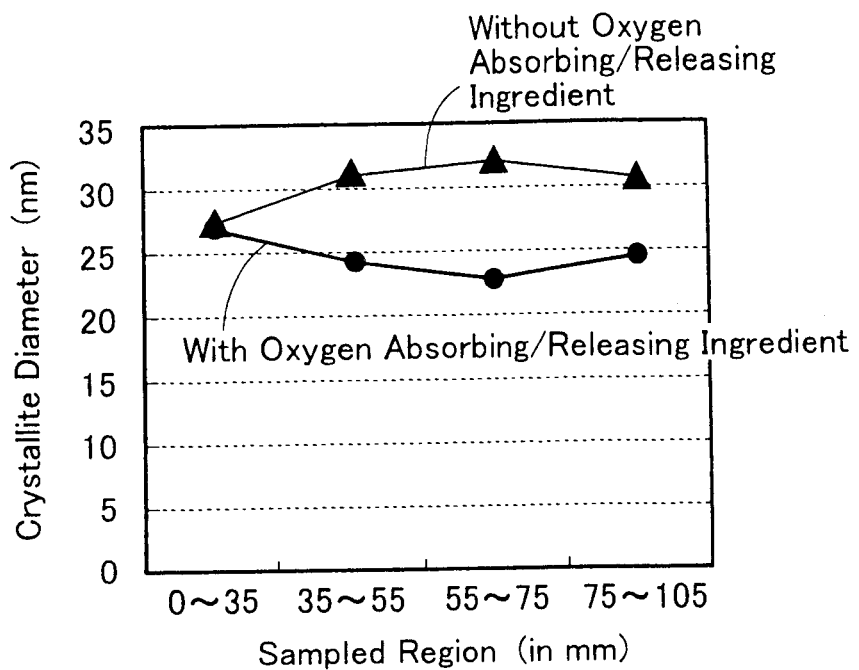
FIG. 18 is a diagram for illustrating particle diameters of support particles at respective sampled parts or regions in catalyst according to Examination No. 7.

Moreover, the catalysts that had undergone the durability test for 200 hours were examined for diameters of crystalline particles of the support with loaded Rh for each one of the specific regions. Specifically, the support with loaded Rh, one of the constituent elements of the second upper catalytic layer 4, was measured for the crystalline-particle diameter for each one of the specific regions in the degraded second upper catalytic layer 4. More specifically, the deteriorated catalysts were divided into four parts or regions that started at the upstream end and headed toward the downstream end, namely, a first region that extended from the 0-mm position (i.e., the upstream end making the origin) to the 35-mm position, a second region that extended from the 35-mm position to the 55-mm position, a third region that extended from the 55-mm position to the 75-mm position, and a fourth region that extended from the 75-mm position to 105-mm position (i.e., the downstream end). Then, samples of the support with loaded Rh were extracted from each of the first, second, third and fourth regions. Then, the respective samples were measured for the crystalline-particle diameters by means of an X-ray diffraction method. Results of the thus measured crystalline-particle diameters are illustrated in FIG. 18. The horizontal axis of FIG. 18 represents the respective positions in the deteriorated catalysts, and the vertical axis represents the particle diameters of the crystalline particles in the support with loaded Rh.

As shown in FIG. 18, the granular growth of the support with loaded Rh was inhibited more in the catalyst comprising the first upper catalytic layer 3 that included an oxygen absorbing/releasing ingredient than in the catalyst comprising the first upper catalytic layer 3 that was free from any oxygen absorbing/releasing ingredient. In general, the fluctuation of atmosphere in oxidation and reduction at high temperatures facilitates the granular growth of oxide. Accordingly, adding an oxygen absorbing/releasing ingredient to the first upper catalytic layer 3 leads to relieving the atmospheric fluctuation. Consequently, it is believed that an oxygen absorbing/releasing agent (e.g., the $CeO_2$—$ZrO_2$—$La_2O_3$—

$Pr_6O_{11}$ composite oxide) in the first upper catalytic layer 3 inhibited the granular growth of the support with loaded Rh in the second upper catalytic layer 4.

In view of the results as above, the following can be appreciated: it is allowable to add an oxygen absorbing/releasing ingredient into the first upper catalytic layer 3 in order that the Rh exhibits the catalytic capabilities maximally in the second upper catalytic layer 4 on the monolithic substrate 1. Taking the results according to above Examination No. 6 as well into consideration, it is permissible that the support with loaded Pd in the first upper catalytic layer 3 can be free from any oxygen absorbing/releasing ingredient. Hence, when the first upper catalytic layer 3 comprises some oxygen absorbing/releasing ingredient, it is possible to say that it is allowable to incorporate an oxygen absorbing/releasing ingredient into the first upper catalytic layer 3, not as one of the elements making the support with loaded Pd, but as intervening particles that do not constitute the elements of the support with loaded Pd.

Examination No. 8 for Relationship Between OSC and Content of $CeO_2$ Being Included in Oxygen Absorbing/Releasing Ingredient in First Upper Catalytic Layer As illustrated in FIG. 15, catalysts for converting exhaust gases were prepared, catalysts which were provided with the first upper catalytic layer 3 on the upstream side of the substrate 1 and the second upper catalytic layer 4 on the downstream side of the substrate 1. The substrate 1, first upper catalytic layer 3 and second upper catalytic layer 4 comprised the same constituent elements as those of the substrate 1, first upper catalytic layer 3 and second upper catalytic layer 4 according to Examination No. 6. In Examination No. 8, note however that the first upper catalytic layer 3 was formed by make use of the slurry "B1" according to Examination No. 7. Moreover, no Pd was loaded on the $CeO_2$—$ZrO_2$—$La_2O_3$—$Pr_6O_{11}$ composite oxide, an oxygen absorbing/releasing ingredient, in the slurry "B1" used herein. In addition, the upper catalytic layer 3 included the $CeO_2$—$ZrO_2$—$La_2O_3$—$Pr_6O_{11}$ composite oxide that comprised $CeO_2$ in five different concentrations that varied as follows: 0% by mass; 20% by mass; 25% by mass; 30% by mass; and 60% by mass.

The thus made five catalysts for converting exhaust gases were subjected to a durability that was performed under the same conditions as those described in Examination No. 6. The catalysts that had undergone the durability test were placed in an exhaust system of an engine with 2.4 L displacement, respectively. Then, the catalysts were held at a catalyst-bed temperature of 450° C. to measure transitional discharge time during which they emitted oxygen when the air-fuel ratio A/F was switched from 15.1 to 14.1. Results of the measurement are illustrated in FIG. 19.

Figure 19:
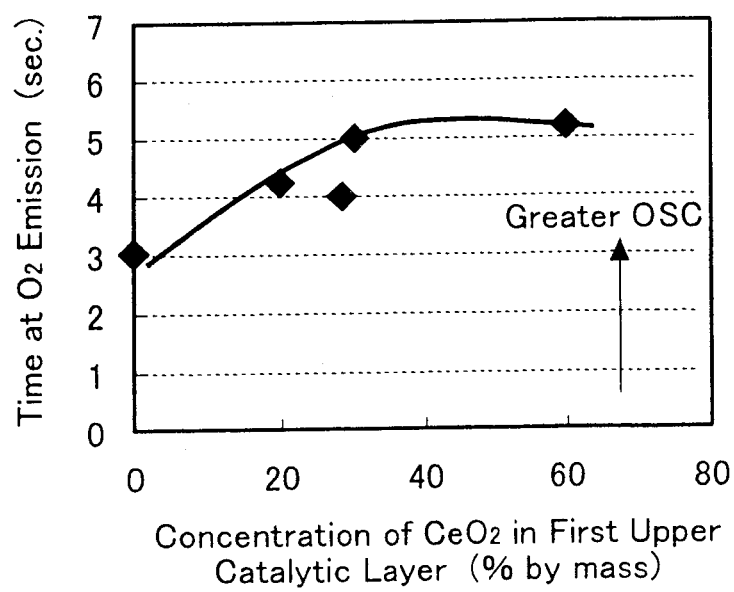
FIG. 19 is a diagram for illustrating a relationship between contents of $CeO_2$, which was included in the oxygen absorbing/releasing ingredient in the first upper catalytic layer, and times at oxygen emission in Examination No. 8.

As illustrated in FIG. 19, it is observed that the catalysts tended to exhibit longer transitional times for discharging oxygen as the content of $CeO_2$, which was included in the oxygen absorbing/releasing ingredient (e.g., the $CeO_2$—$ZrO_2$—$La_2O_3$—$Pr_6O_{11}$ composite oxide), increased. Especially, it is appreciated that the transitional oxygen-discharge times inclined to saturate in terms of the prolongation in the case where the first upper catalytic layer 3 contained the oxygen absorbing/releasing ingredient that included $CeO_2$ in an amount of from 30 to 60% by mass when the entirety of the oxygen absorbing/releasing ingredient was taken as 100% by mass. According to these results, it is allowable that the first upper catalytic layer 3 can comprise an oxygen absorbing/releasing ingredient that includes $CeO_2$ in an amount of from 30 to 60% by mass with respect to the entire oxygen absorbing/releasing ingredient being taken as 100% by mass.

The invention claimed is:

1. A catalyst for converting exhaust gases, the catalyst comprising:
   a substrate for forming a gas flow passage in which exhaust gases flow; and
   a catalytic layer on the substrate;
   the catalytic layer comprising:
      a lower catalytic layer on the substrate, and having a surface that does not come into contact with the substrate, the surface being made of an upstream side that is disposed on an upstream side of the catalytic layer with respect to a flowing direction of the exhaust gases and a downstream side that is disposed on a more downstream side than the upstream side is disposed in the flowing direction of the exhaust gases;
      a first upper catalytic layer covering the upstream side of the lower catalytic layer;
      a second upper catalytic layer covering the downstream side of the lower catalytic layer;
      at least one member being selected from the group consisting of palladium (Pd) and platinum (Pt), and being loaded in the lower catalytic layer;
      Pd being loaded in the first upper catalytic layer;
      the first upper catalytic layer exhibiting a concentration of loaded Pd that falls in a range of from 5.8 to 8.8% by mass when the entirety of the first upper catalytic layer is taken as 100% by mass; and
      rhodium (Rh) being loaded in the second upper catalytic layer.

2. The catalyst according to claim 1, wherein the first upper catalytic layer has a length that exhibits a proportion of from 20 to 40% when the entire length of the lower catalytic layer is taken as 100%.

3. The catalyst according to claim 1, wherein the second upper catalytic layer has a length that exhibits a proportion of from 70 to 85% when the entire length of the lower catalytic layer is taken as 100%.

4. The catalyst according to claim 1, wherein:
   the lower catalytic layer further comprises an oxygen absorbing/releasing ingredient; and
   the lower catalytic layer is in a coating amount of from 105 to 155 g per 1 liter of the substrate.

5. The catalyst according to claim 1, wherein the first upper catalytic layer comprises $Al_2O_3$ on which Pd is loaded, and an oxygen absorbing/releasing ingredient that is free from loaded Pd.

6. The catalyst according to claim 5, the first upper catalytic layer comprises the oxygen absorbing/releasing ingredient that includes $CeO_2$ in an amount of from 30 to 60% by mass when the entirety of the oxygen absorbing/releasing ingredient is taken as 100% by mass.

7. The catalyst according to claim 1, wherein a leading section of the second upper catalytic layer covers a trailing section of the first upper catalytic layer by a length that exhibits a proportion of 25% or less when the entire length of the lower catalyst is taken as 100%.

8. The catalyst according to claim 4, wherein the coating amount for forming the lower catalytic layer ranges from 150 to 155 g per 1 liter of the substrate.

* * * * *

UNITED STATES PATENT AND TRADEMARK OFFICE
CERTIFICATE OF CORRECTION

PATENT NO.        : 8,501,661 B2  
APPLICATION NO.   : 13/519906  
DATED             : August 6, 2013  
INVENTOR(S)       : Tomoaki Sunada et al.

Page 1 of 1

It is certified that error appears in the above-identified patent and that said Letters Patent is hereby corrected as shown below:

In the Specification

Column 27, line 32, "second upper catalytic layer 3" should read
--first upper catalytic layer 3--;

Column 27, line 33, "second upper catalytic layer 3" should read
--first upper catalytic layer 3--; and Column 27, line 40, "second upper catalytic layer 3" should read
--first upper catalytic layer 3--.

Signed and Sealed this
Seventh Day of January, 2014

Margaret A. Focarino
*Commissioner for Patents of the United States Patent and Trademark Office*